(12) United States Patent
Cha et al.

(10) Patent No.: US 11,946,650 B2
(45) Date of Patent: Apr. 2, 2024

(54) RANGE HOOD AND METHOD FOR CONTROLLING THE RANGE HOOD

(71) Applicant: Samsung Electronics Co., Ltd., Suwon-si (KR)

(72) Inventors: Jae-hoon Cha, Suwon-si (KR); Hyeong-jin Jang, Seoul (KR); Dong-hyun Sohn, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/702,300

(22) Filed: Mar. 23, 2022

(65) Prior Publication Data

US 2022/0221161 A1    Jul. 14, 2022

Related U.S. Application Data

(63) Continuation of application No. 15/852,926, filed on Dec. 22, 2017, now abandoned.

(30) Foreign Application Priority Data

Jun. 26, 2017    (KR) .................. 10-2017-0080642

(51) Int. Cl.
*F24C 15/20* (2006.01)
*F24C 7/08* (2006.01)
(Continued)

(52) U.S. Cl.
CPC ...... *F24C 15/2042* (2013.01); *F24C 15/2021* (2013.01); *G06F 3/14* (2013.01);
(Continued)

(58) Field of Classification Search
None
See application file for complete search history.

(56) References Cited

U.S. PATENT DOCUMENTS 3,690,245 A * 9/1972 Ferlise ................ F24C 15/2021
                                                126/299 D
5,361,681 A * 11/1994 Hedstrom ............... F24C 7/087
                                                219/490

(Continued)

FOREIGN PATENT DOCUMENTS

CN    101871657 B    10/2010
CN    103119637 A *  5/2013 ............ H04L 12/10
(Continued)

OTHER PUBLICATIONS

Chinese Office Action with English translation dated Apr. 1, 2022; Chinese Appln. No. 201880023642.X.

(Continued)

*Primary Examiner* — Gelek W Topgyal
(74) *Attorney, Agent, or Firm* — Jefferson IP Law, LLP

(57) ABSTRACT

A range hood and a method for controlling the range hood are provided. The apparatus includes a range hood which is capable of photographing a cooking process that is being performed on an upper plate of a cook top by using a camera disposed in the main body of the range hood, and a method for controlling the range hood are provided. In some of the example embodiments, a range hood is capable of photographing a cooking process that is being performed on an upper plate of a cook top that is positioned below a bottom surface of the main body.

18 Claims, 25 Drawing Sheets

(51) Int. Cl.
*G06F 3/14* (2006.01)
*G06F 3/147* (2006.01)
*H04N 5/38* (2006.01)
*H04N 7/18* (2006.01)
*H04N 23/54* (2023.01)
*H04N 23/57* (2023.01)
*H04N 23/60* (2023.01)

(52) U.S. Cl.
CPC .............. *G06F 3/147* (2013.01); *H04N 5/38* (2013.01); *H04N 23/54* (2023.01); *H04N 23/57* (2023.01); *H04N 23/60* (2023.01); *F24C 7/083* (2013.01); *F24C 15/2064* (2013.01); *G06F 3/1454* (2013.01); *G09G 2354/00* (2013.01); *H04N 7/183* (2013.01)

(56) References Cited

U.S. PATENT DOCUMENTS

| | | | |
|---|---|---|---|
| 7,696,454 B2 | 4/2010 | Nam et al. | |
| 9,330,469 B2* | 5/2016 | Guan | F24C 7/083 |
| 9,412,048 B2* | 8/2016 | Guan | G06K 9/627 |
| 9,449,220 B2* | 9/2016 | Guan | G06V 20/52 |
| 2007/0089725 A1* | 4/2007 | Patarchi | H04N 7/186 |
| | | | 126/24 |
| 2007/0125364 A1* | 6/2007 | Crnkovich | F24C 15/2021 |
| | | | 126/299 R |
| 2007/0246453 A1 | 10/2007 | Nam et al. | |
| 2008/0102743 A1 | 5/2008 | Williams | |
| 2009/0119234 A1* | 5/2009 | Pinckney | G06N 20/00 |
| | | | 706/12 |
| 2009/0244263 A1* | 10/2009 | Saito | G06T 7/593 |
| | | | 348/47 |
| 2010/0182136 A1* | 7/2010 | Pryor | G06F 3/017 |
| | | | 340/425.5 |
| 2010/0231506 A1* | 9/2010 | Pryor | F24C 7/082 |
| | | | 348/E7.085 |
| 2011/0134413 A1* | 6/2011 | Has | F24C 7/082 |
| | | | 356/51 |
| 2011/0253693 A1* | 10/2011 | Lyons | A47J 27/00 |
| | | | 219/209 |
| 2011/0317872 A1* | 12/2011 | Free | G06V 40/165 |
| | | | 382/118 |
| 2012/0111852 A1* | 5/2012 | Bach | H05B 1/0266 |
| | | | 219/448.11 |
| 2013/0171304 A1* | 7/2013 | Huntley | F24C 7/08 |
| | | | 434/127 |
| 2013/0213483 A1* | 8/2013 | Bagwell | F15D 1/02 |
| | | | 137/2 |
| 2014/0049636 A1* | 2/2014 | O'Donnell | G08B 13/19684 |
| | | | 348/143 |
| 2014/0116414 A1* | 5/2014 | Sinur | F24C 15/2042 |
| | | | 126/299 D |
| 2014/0156082 A1* | 6/2014 | Ha | H04L 12/2818 |
| | | | 700/275 |
| 2014/0307088 A1* | 10/2014 | DeJesus | G08B 13/1963 |
| | | | 348/143 |
| 2016/0091714 A1* | 3/2016 | Hui | H04N 5/22521 |
| | | | 359/512 |
| 2017/0000292 A1* | 1/2017 | Park | H04N 5/23203 |
| 2017/0019731 A1* | 1/2017 | McBride | H04N 5/2252 |
| 2017/0099988 A1* | 4/2017 | Matloubian | A47J 37/0664 |
| 2017/0126964 A1* | 5/2017 | Fukui | H04N 5/772 |
| 2017/0182952 A1* | 6/2017 | Carlson | B60S 1/026 |
| 2017/0353998 A1* | 12/2017 | Cha | H05B 6/6435 |
| 2018/0210521 A1* | 7/2018 | Kilgore | H04N 5/2252 |
| 2018/0372326 A1* | 12/2018 | Park | F27B 5/18 |

FOREIGN PATENT DOCUMENTS

| | | | | |
|---|---|---|---|---|
| CN | 101871657 B | * | 1/2014 | |
| CN | 203501260 U | | 3/2014 | |
| CN | 203501260 U | * | 3/2014 | |
| CN | 104501257 A | * | 4/2015 | |
| CN | 105526614 A | * | 4/2016 | |
| CN | 105526614 A | | 4/2016 | |
| CN | 105841207 A | | 8/2016 | |
| CN | 106123073 A | * | 11/2016 | |
| CN | 106123073 A | | 11/2016 | |
| CN | 106383452 A | | 2/2017 | |
| CN | 106383452 A | * | 2/2017 | .............. G05B 15/02 |
| CN | 106470304 A | * | 3/2017 | |
| CN | 206037178 U | | 3/2017 | |
| CN | 106885279 A | | 6/2017 | |
| EP | 1 111 523 A1 | | 6/2001 | |
| JP | 10-288342 A | | 10/1998 | |
| JP | 2009-099365 A | | 5/2009 | |
| JP | 2016-020749 A | | 2/2016 | |
| JP | 2017-040430 A | | 2/2017 | |
| JP | 2017105876 A | * | 6/2017 | |
| KR | 10-2002-0036478 A | | 5/2002 | |
| KR | 10-2006-0088747 A | | 8/2006 | |
| KR | 10-2007-0103871 A | | 10/2007 | |
| KR | 10-2012-0006411 A | | 1/2012 | |
| KR | 10-2014-0039733 A | | 4/2014 | |
| KR | 10-1539078 B1 | | 7/2015 | |
| WO | 2015/062666 A1 | | 5/2015 | |
| WO | WO-2015062666 A1 | * | 5/2015 | .............. F24C 7/082 |
| WO | 2017/082843 A1 | | 5/2017 | |
| WO | WO-2017082843 A1 | * | 5/2017 | .......... F24C 15/2021 |

OTHER PUBLICATIONS

Extended European Search Report dated Jan. 7, 2020, issued in European Application No. 18824457.8-1009.
Korean Office Action dated May 31, 2021, issued in Korean Patent Application No. 10-2017-0080642.
Chinese Office Action dated Sep. 8, 2021, issued in Chinese Patent Application No. 201880023642.X.

* cited by examiner

RANGE HOOD AND METHOD FOR CONTROLLING THE RANGE HOOD

CROSS-REFERENCE TO RELATED APPLICATION(S)

This application is a continuation application of prior application Ser. No. 15/852,926, filed on Dec. 22, 2017, which claims priority under 35 U.S.C. § 119(a) of a Korean patent application filed on Jun. 26, 2017 in the Korean Intellectual Property Office and assigned Serial number 10-2017-0080642, the entire disclosure of which is hereby incorporated by reference.

TECHNICAL FIELD

The present disclosure relates to a range hood and a method for controlling the range hood. More particularly, the present disclosure relates to a range hood having a camera photographing through a bottom surface facing a cook top positioned under the range hood, and a method for controlling the range hood.

BACKGROUND

More and more families are installing cook tops and range hoods in their kitchens. The cook top may mean an electric range and/or a gas range for heating the cooking container (or the object to be cooked) through one or a plurality of burners. The cook top may be referred to as a cooking apparatus. The cook top described above can be implemented in standalone or in an oven range including an oven under the cook top.

The range hood located above the cook top (e.g., in the opposite direction of gravity) can discharge the smoke and/or odor generated from the cooking container (or the object to be cooked) to the outside through the fan. The range hood is one of the ventilators that can be installed in the kitchen and can be installed with the cook top.

Until the cooking is completed, the user must continuously check whether the cooking container (or the object to be cooked) placed on the cook top is overheated or overcooked.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a range hood which includes a main body, a camera disposed in the main body and configured to capture an image of an upper plate of a cook top that is positioned below the main body, and a processor configured to control the camera to capture an image of a cooking process that is being performed on the upper plate.

In accordance with an aspect of the present disclosure, the range hood may include a transceiver disposed in the main body, wherein the processor is further configured to control the transceiver to transmit the image to an external destination.

In accordance with an aspect of the present disclosure, the main body may include an opening in a bottom surface for capturing the image.

In accordance with an aspect of the present disclosure, a method for controlling a range hood is provided. The method includes supplying power to a range hood which includes a camera configured to capture images of a cook top on which a cooking container is to be placed, capturing an image of a cooking process that is being performed on the cook top, connecting with an external device through a transceiver, and transmitting the image to the external device, wherein, while capturing the image, the range hood is configured to provide illumination through an auxiliary light source.

In accordance with an aspect of the present disclosure, the method further comprises, in response to the transceiver being connected to a second transceiver disposed in the cook top, the second transceiver is configured to transmit the image to the external device.

In accordance with another aspect of the present disclosure, a cook top is provided. The cook top includes a main body, a transceiver disposed in the main body and configured to connect with a range hood that is positioned above the main body, a heating unit configured to heat a cooking container placed on an upper plate of the main body, and a processor configured to control the transceiver to receive an image that is captured by the range hood while heating the cooking container.

In accordance with an aspect of the present disclosure, the controller may control the communicator at least one from among the video and the image to an external device.

In accordance with another aspect of the present disclosure, a portable device is provided. The portable device includes a display, a communicator which is connected with at least one of a cook top and a range hood which is positioned above the cook top and has a camera photographing the cook top, and a processor configured to control the display and the communicator, wherein the processor controls to receive at least one of a video and image corresponding to a cooking process performed on the cook top photographed through the camera via the communicator and to display the received video or image on the display.

In accordance with another aspect of the present disclosure, a display device is provided. The display device includes a display, a communicator which is connected with at least one of a cook top and a range hood which is positioned above the cook top and has a camera photographing the cook top, and a processor configured to control the display and the communicator, wherein the processor controls to receive at least one of a video and image corresponding to a cooking process performed on the cook top photographed through the camera via the communicator and to display the received video or image on the display.

In accordance with another aspect of the present disclosure, a home appliance is provided. The home appliance includes a display, a communicator which is connected with at least one of a cook top and a range hood which is positioned above the cook top and has a camera photographing the cook top, and a processor configured to control the display and the communicator, wherein the processor controls to receive at least one of a video and image corresponding to a cooking process performed on the cook top photographed through the camera via the communicator and to display the received video or image on the display.

In accordance with another aspect of the present disclosure, a server is provided. The server includes a communicator which is connected with at least one of a cook top and a range hood which is positioned above the cook top and has a camera photographing the cook top, a storage, and a processor configured to control the communicator and the storage, wherein the processor controls to receive at least one of a video and image corresponding to a cooking process performed on the cook top photographed through the camera via the communicator and to store the received video or image on the storage.

A range hood at which a camera capable of photographing through a bottom surface facing an upper plate of a cook top is positioned may be provided.

A range hood which is capable of photographing a cooking process performed on an upper plate of a cook top by using a camera capable of photographing through a bottom surface facing the upper plate of the cook top and transmitting the photographed cooking process to an external destination may be provided.

A range hood which is capable of transmitting a state of a cook top and a state of a cooking container (or object to be cooked) placed on an upper plate of the cook top to an external destination by using a camera capable of photographing through a bottom surface facing the upper plate of the cook top may be provided.

A range hood which is capable of photographing a cooking process performed on an upper plate of a cook top by using a camera capable of photographing through a bottom surface facing the upper plate of the cook top, and transmitting the photographed cooking process to an external destination so that the user may identify it, and a method for controlling the range hood may be provided.

A range hood which is capable of transmitting a state of a cook top and a state of a cooking container (or object to be cooked) placed on an upper plate of the cook top to an external destination by using a camera capable of photographing through a bottom surface facing the upper plate of the cook top so that the user may identify it, and a method for controlling the range hood may be provided.

A range hood which is capable of photographing a cooking process performed on an upper plate of a cook top by using a camera capable of photographing through a bottom surface facing the upper plate of the cook top, and transmitting the photographed cooking process to an external destination so that the user may identify it through a peripheral electronic device (e.g., portable terminal or display device), and a method for controlling the range hood may be provided.

A range hood which is capable of transmitting a state of a cook top and a state of a cooking container (or object to be cooked) placed on an upper plate of the cook top by using a camera capable of photographing through a bottom surface facing the upper plate of the cook top so that the user may identify it through a peripheral electronic device (e.g., portable terminal or display device), and a method for controlling the range hood may be provided.

A range hood which is capable of photographing a cooking process performed on an upper plate of a cook top by using a camera capable of photographing through a bottom surface facing the upper plate of the cook top, and transmitting the photographed cooking process to an external destination so that a third party may share it through a peripheral electronic device (e.g., portable terminal or display device), and a method for controlling the range hood may be provided.

A range hood which is capable of transmitting a state of a cook top and a state of a cooking container (or object to be cooked) placed on an upper plate of the cook top by using a camera capable of photographing through a bottom surface facing the upper plate of the cook top so that a third party may share it through a peripheral electronic device (e.g., portable terminal or display device), and a method for controlling the range hood may be provided.

According to the various example embodiments described above, a range hood which is capable of photographing at least one of a state of a cooking container (or object to be cooked) placed on an upper plate of a cook top and a cooking process performed on the upper plate of the cook top through a camera positioned on a bottom surface facing the upper plate of the cook top and transmitting it to an external destination, and a method for controlling the range hood may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
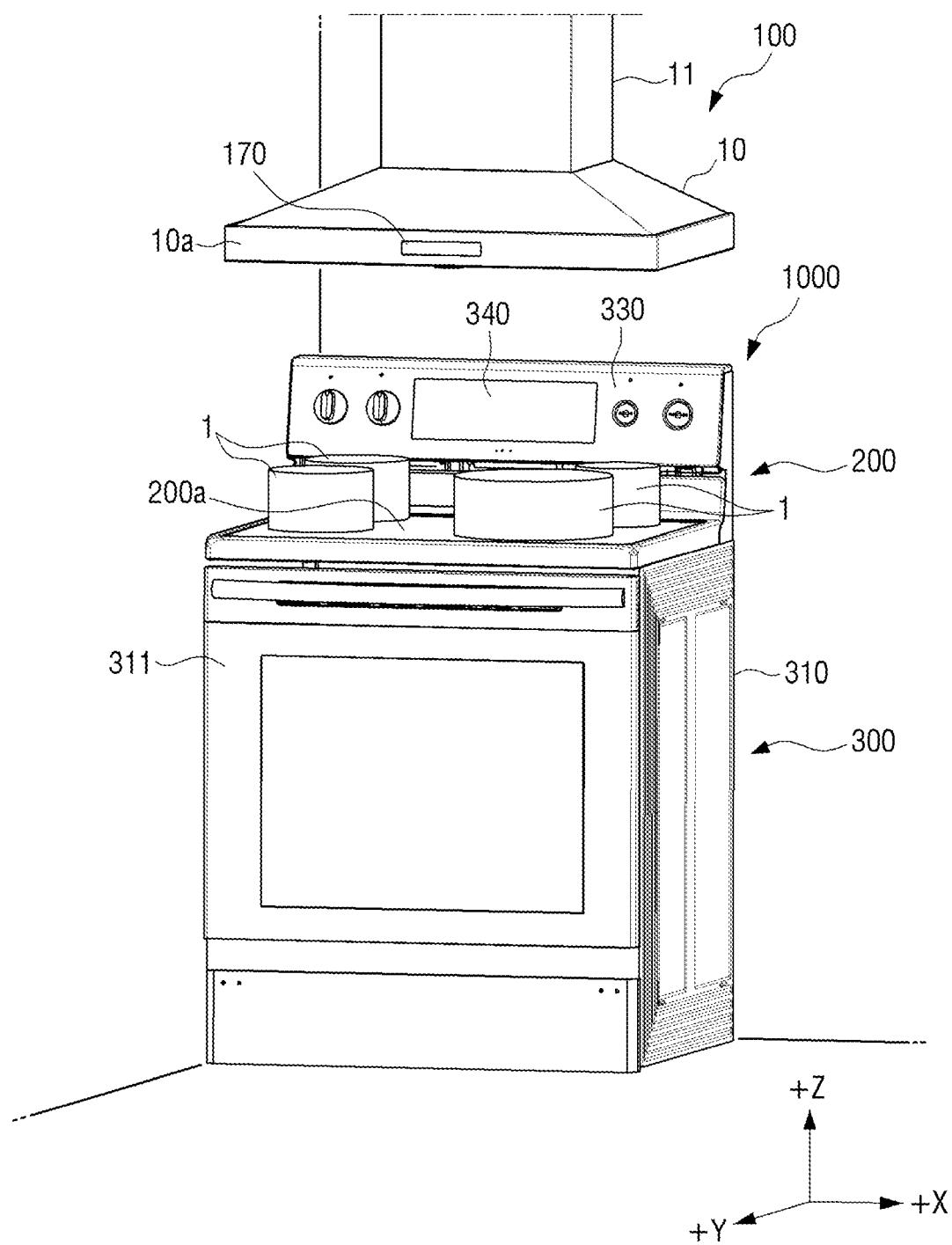
FIG. 1A is a perspective view illustrating a range hood having a camera and a cook top according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terminology including an ordinal number such as "first," "second," and so on may be used to describe a variety of constituent elements, but the elements are not limited by the terminology. In embodiments of the present disclosure, relational terms such as first and second, and the like, may be used to distinguish one entity from another entity, without necessarily implying any actual relationship or order between such entities. For example, a first element may be named a second element without departing from the scope of right of various example embodiments, and similarly, a second element may be named a first element. As used herein, the term "and/or," includes any and all combinations of one or more of the associated listed items.

According to an example embodiment, the application refers to an operation system (OS) for computers or software executed on a mobile OS to be used by a user. For example, the application may include a web browser, a camera application, a mobile payment application (or, electronic payment application or payment application), a photo album application, a word processor, a spread sheet, a contacts application, a calendar application, a memo application, an alarm application, a social network system (SNS), a call application, a game store, a game application, a chatting application, a map application, a music player or a video player.

According to an example embodiment, an application may refer to a range hood or software which is executed in an electronic device (e.g., portable device, display device, home appliance, wearable device or server) connected to the range hood via wire or wirelessly. According to an example embodiment, an application may refer to software which is executed in a range hood in response to a user input that is received.

A content may be executed or displayed through an application which is executed correspondingly. For example, a content may include a video file or audio file which is executed in a video player, which is one of the application, a video file or audio file which is photographed by a camera application, a game file which is executed in a game application, a music file which is reproduced in a music player, a photo file which is displayed in a photo album application, a web page file which is displayed in a web browser, or payment information (e.g., mobile card number, payment amount, product name, service name or store name) which is displayed on an electronic payment application. In addition, a content may include a call screen (e.g., including caller ID, caller name, call start time, or caller video (or caller image) by a video call) which is displayed in a call application.

A content may include a screen of an application (or widget) being executed and a user interface which configures the application screen. In addition, a content may include one or a plurality of contents as well.

The widget refers to a mini application which is one of the graphical user interfaces (GUIs) for facilitating an interaction between a user and an application or between the user and an OS. For example, the widget may include a weather widget, a calculator widget, a clock widget, etc.

In an example embodiment, a "user input" may be a term which includes, for example, selection of a button (or key) by a user, depress (or click) of a button (or key) by a user, touch of a soft button (or soft key) by a user, a touch (including non-contact such as hovering) received (or detected) in a touch screen by a user, a touch gesture (including non-contact such as hovering, a user voice, a user presence (e.g., a user appears within a recognition range of a camera) received (or detected) in a touch screen by a user, or a user motion. In addition, a 'selection of a button (or key)' may be used to refer to a press (or click) of a button (or key) or a touch of a soft button (or soft key).

Terms used in the present specification are used only in order to describe specific embodiments rather than limiting the present disclosure. It is to be understood that the singular forms "a," "an," and "the" include plural referents unless the context clearly dictates otherwise. Throughout this specification, it will be understood that the term "comprise" and variations thereof, such as "comprising" and "comprises", specify the presence of features, numbers, operations, components, parts, or combinations thereof, described in the specification, but do not preclude the presence or addition of one or more other features, numbers, operations, components, parts, or combinations thereof. Like reference numerals in the drawings denote members performing substantially the same function.

Figure 1B:
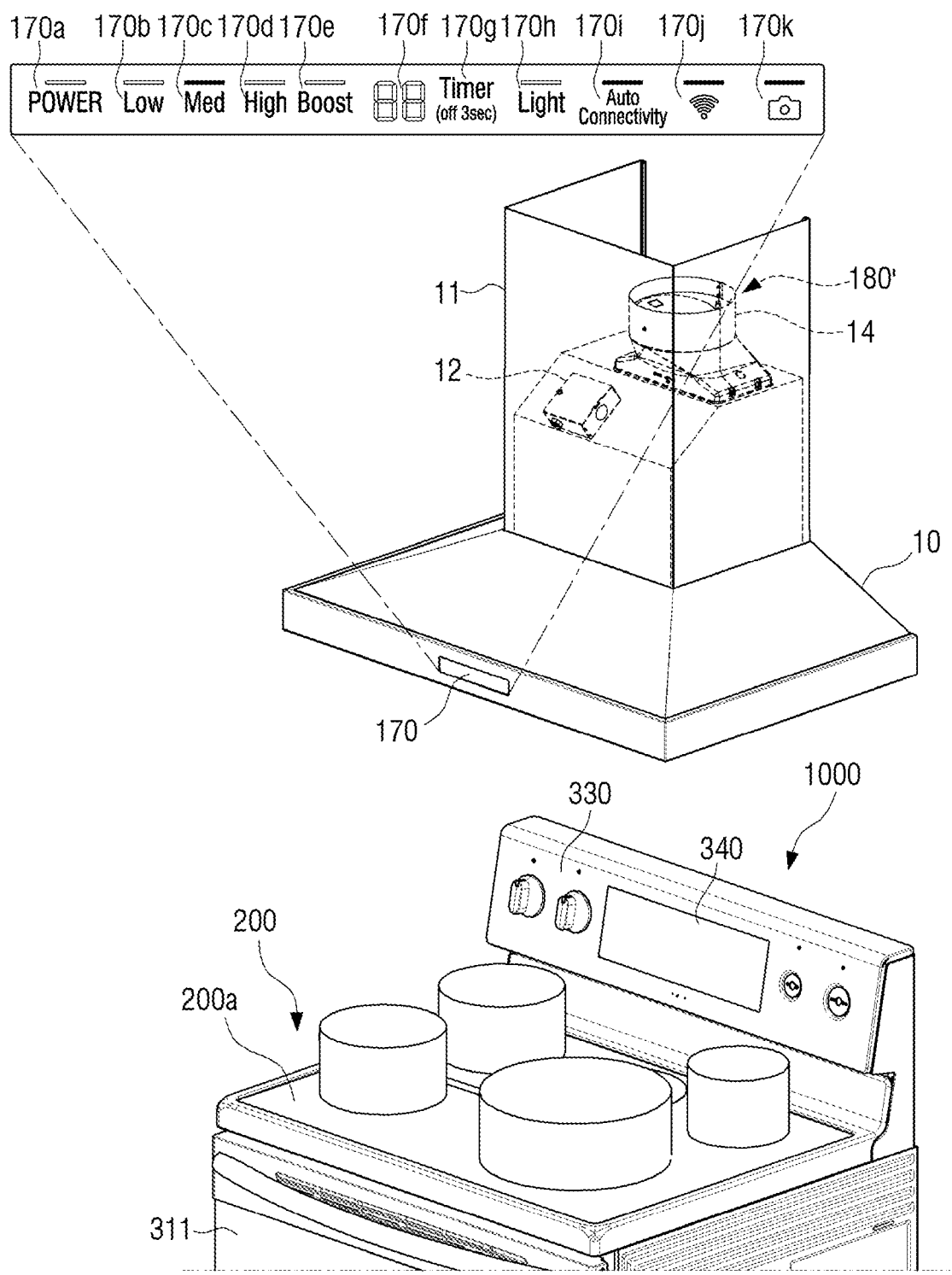
FIG. 1B is a perspective view illustrating a range hood having a camera and a cook top according to an embodiment of the present disclosure.
Figure 1C:
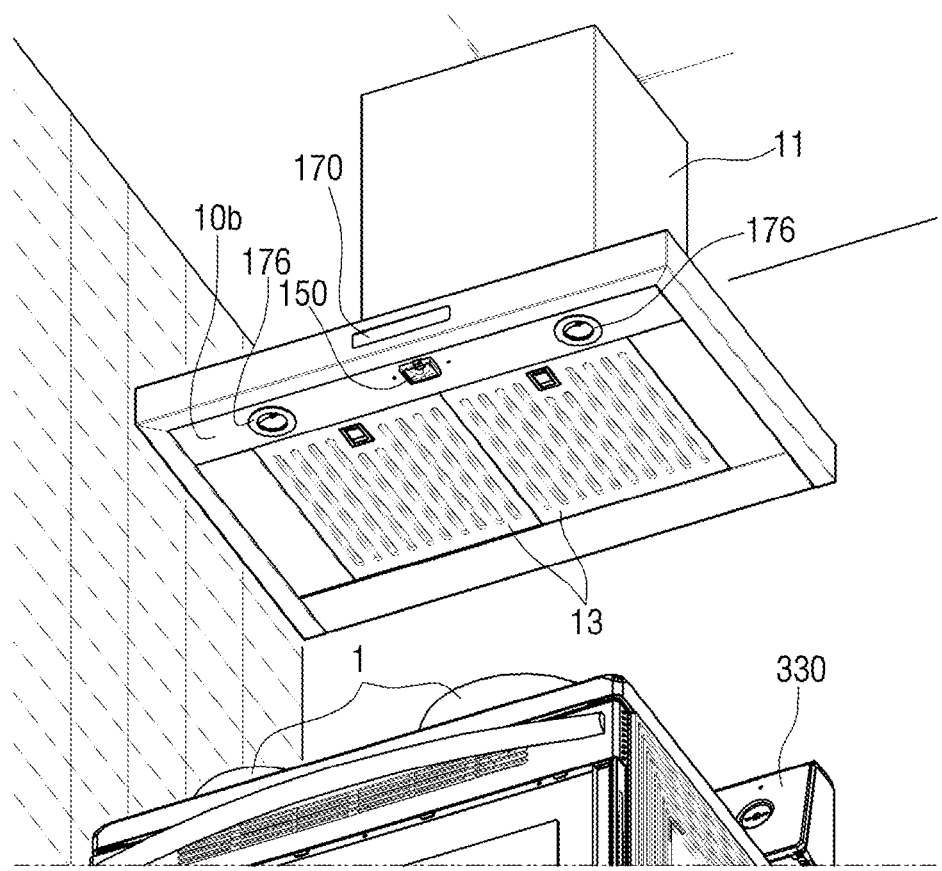
FIG. 1C is a perspective view illustrating a range hood having a camera positioned on a bottom surface and a cook top according to an embodiment of the present disclosure.

FIG. 1A is a perspective view illustrating a range hood having a camera and a cook top according to an embodiment of the present disclosure, FIG. 1B is a perspective view illustrating a range hood having a camera and a cook top according to an embodiment of the present disclosure, and FIG. 1C is a perspective view illustrating a range hood having a camera positioned on a bottom surface and a cook top according to an embodiment of the present disclosure.

Referring to FIGS. 1A, 1B, and 1C, a range hood 100 which is positioned on top of an upper plate 200a (for example, +z-axis direction) may include a main body 10, a duct cover 11, a control box 12 inside the duct cover 11, a light emitting diode (LED) 176, which can be implemented as any suitable auxiliary light source, and/or a first driver 180' (see FIG. 2). Buttons 170a-170k (or functional buttons) and/or a touch screen 170 (or a display) displaying a content may be positioned on a front surface 10a (e.g., +y-axis direction) of the main body 10. The number and function of the buttons 170a-170k listed above may be added, changed, or deleted according to a structure (or function) of the range hood 100.

A touch screen 170 which is capable of receiving a user input (e.g., touch or selection of a button 170a-170k) and displaying a screen of an application (or widget) may be positioned. The buttons 170a-170k may be displayed in the touch screen 170 or may be positioned separately from the touch screen 170. The buttons 170a-170k may be buttons which are displayed in a touch screen, touch buttons or physical buttons.

A camera 150 may be positioned at a bottom surface 10b (e.g., −z-axis direction) of the main body 10. One camera or two or more cameras may be provided. The camera 150 may be positioned in a center area (e.g., area including a half position of the width of the bottom surface 10b) of the bottom surface 10b of the main body 10. The camera 150 may be positioned in a center area (e.g., area including a half position of the width of the bottom surface 10b) excluding a baffle filter 13 area in the bottom surface 10b of the main body 10.

The LED 176 may be respectively positioned on at least one of the left side and right side of the camera 150. In an example embodiment, the LED 176 may be referred to as an auxiliary light source.

The speaker 175 may be positioned in one of an area adjacent to the camera 150 (e.g., within a radius of 300 mm) and an area adjacent to the touch screen 170 (e.g., within a radius of 300 mm). In addition, one speaker or two or more speakers 175 may be provided.

A cook top 200 which is positioned under (e.g., −z-axis direction) the range hood 100 may include one of an electric range, a gas range and an induction range. In addition, the cook top 200 may include a combination of an electric range, a gas range, and an induction range.

An oven range 1000 may include an integral oven 300 and the cook top 200. However, the oven 300 and the cook top 200 may be configured as separate appliances. The oven 300 may generate heat by using gas or electricity and cook the food material inside the cavity by convection of air. A door 311 which is positioned on the front surface of the main body 310 of the oven 300 including the cook top 200 may be rotated based on a hinge axis (not illustrated). An operation panel 330 for controlling (or inputting) an operation and/or function of the oven 300 and a display unit 340 may be positioned on the upper surface of the door 311.

The range hood 100 may absorb a smoke, cooking paper and/or odor which are generated in the cooking process through a cooking container 1 placed on the upper plate 200a of the cook top 200 by using a first driver 180'.

Figure 2A:
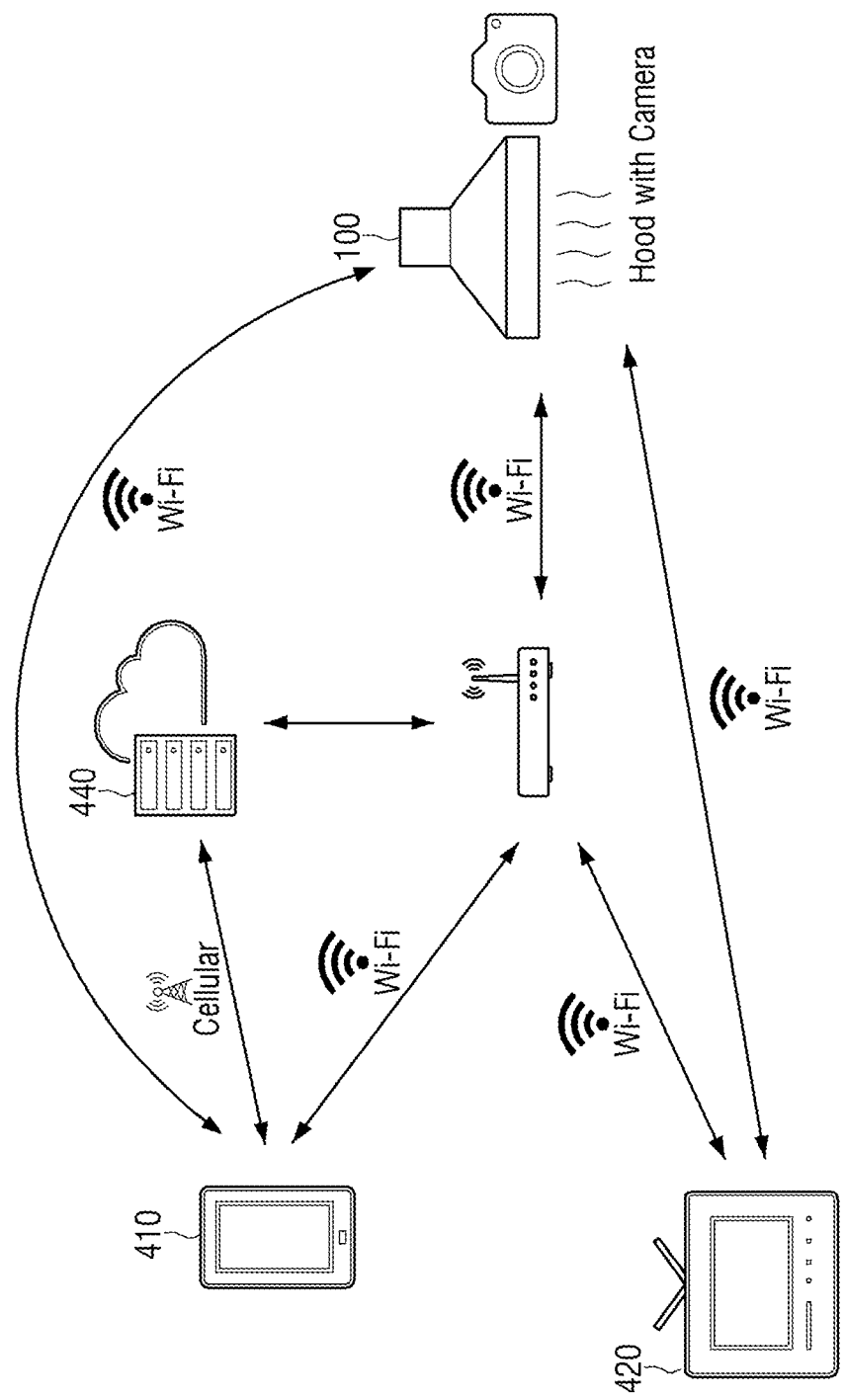
FIG. 2A is a diagram illustrating a range hood having a camera and a cook top according to an embodiment of the present disclosure.
Figure 2B:
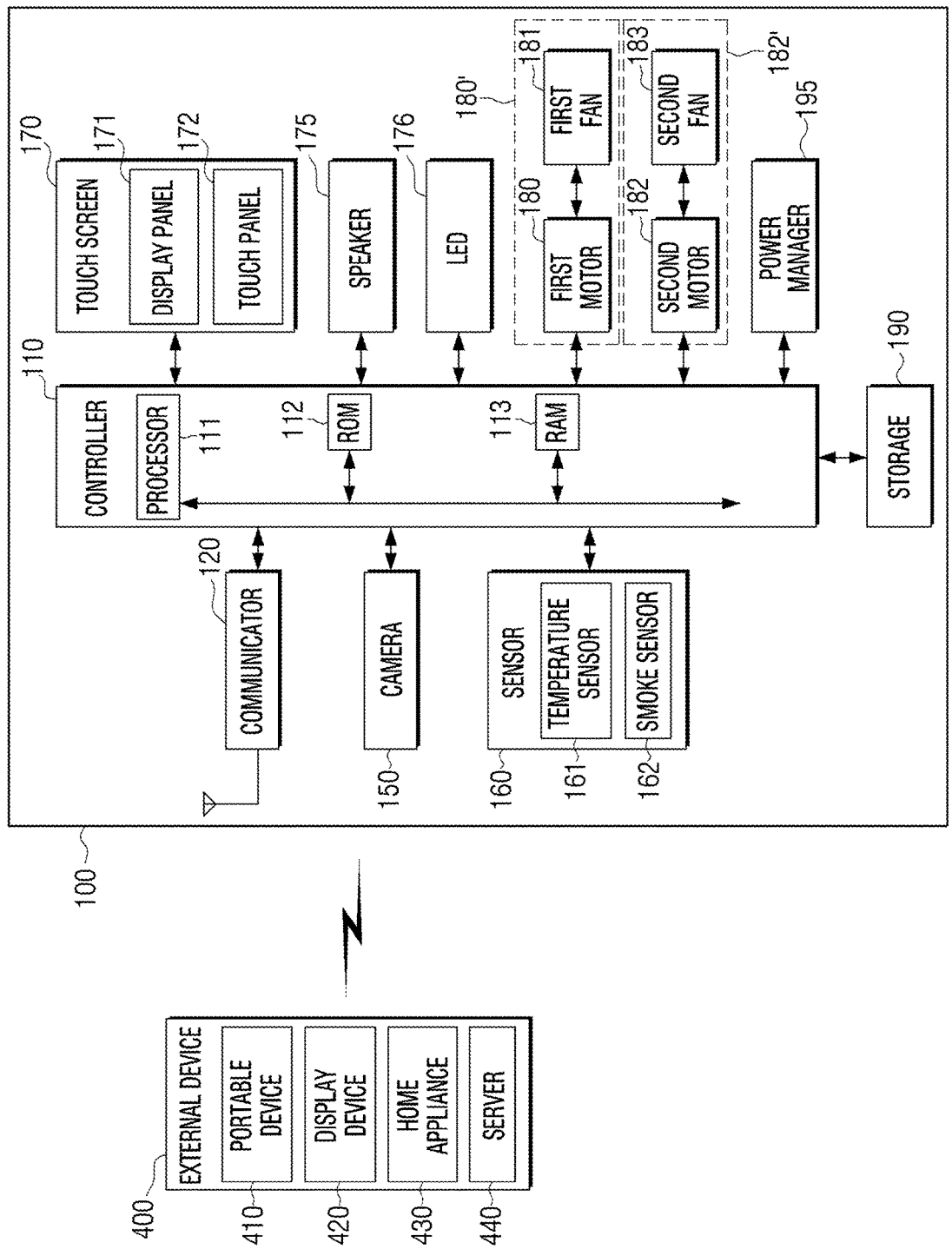
FIG. 2B is a block diagram of the range hood in FIG. 2A according to an embodiment of the present disclosure.
Figure 2C:
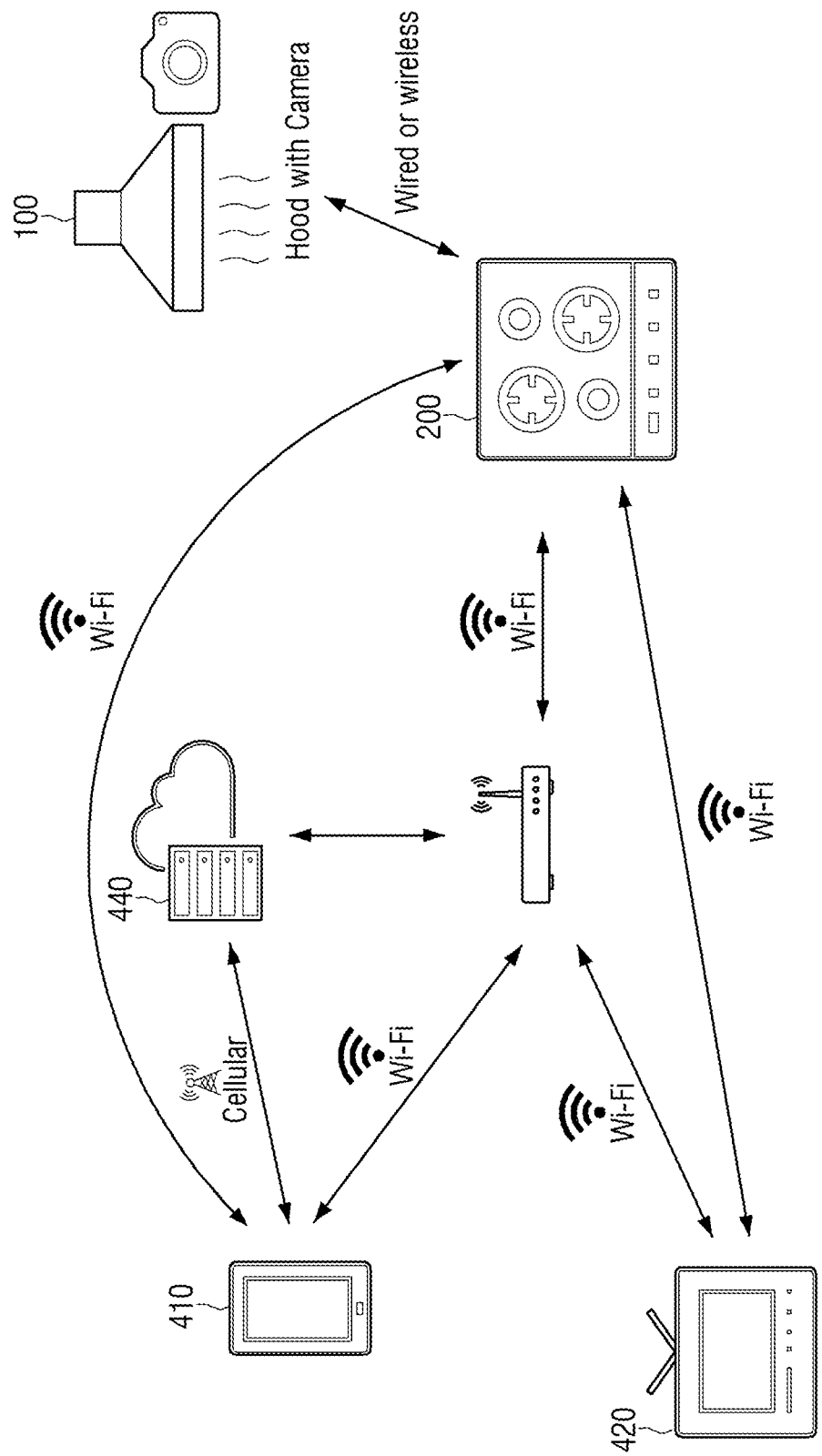
FIG. 2C is a diagram illustrating a range hood having a camera and a cook top, according to another embodiment of the present disclosure.
Figure 2D:
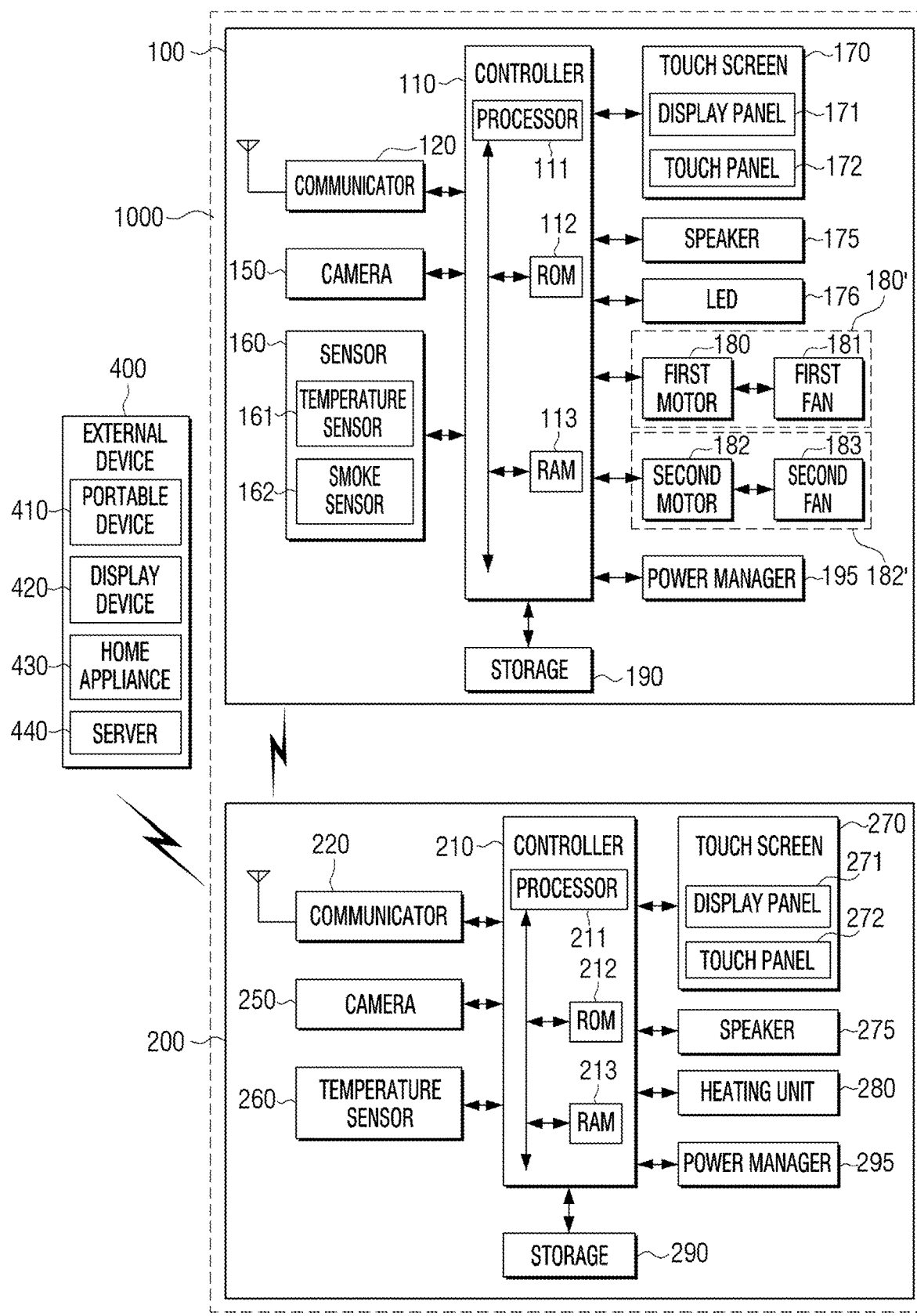
FIG. 2D is a block diagram of the range hood in FIG. 2C according to another embodiment of the present disclosure.

FIG. 2A is a diagram illustrating a range hood having a camera and a cook top according to an embodiment of the present disclosure, FIG. 2B is a block diagram of the range hood in FIG. 2A according to an embodiment of the present disclosure, FIG. 2C is a diagram illustrating a range hood having a camera and a cook top according to another embodiment of the present disclosure, and FIG. 2D is a block diagram of the range hood in FIG. 2C according to another embodiment of the present disclosure.

Referring to FIGS. 2A and 2B, the range hood 100 may be directly connected with an external device 400 by using a communicator 120. The range hood 100 may be connected with the external device 400 by using an access point (AP) (not illustrated) and/or peer-to-peer (P2P) method. The external device 400 may include a portable device 410 including a smart phone, a display device 420 including a television (TV), a home appliance 430 such as an air conditioner and a washing machine, or a server 440.

The range hood 100 may transmit operation information corresponding to an operation (e.g., fan rotation speed) of the range hood or state information corresponding to a state (e.g., normal and abnormal) of the range hood to the range hood via the communicator 120, or may receive control information (e.g., control command corresponding to a fan rotation speed of the range hood 100) from an external source.

The range hood 100 may include a controller 110, a communicator 120, a camera 150, a sensor 160, a touch screen 170, a speaker 175, an LED 176, a first driver 180' including a first motor 180 and a first fan 181, a storage 190 and a power manager 195. The range hood 100 may include a sensor 160 (e.g., temperature sensor 161 and/or smoke sensor 162). In addition, the range hood 100 may further include a microphone (not illustrated) which receives a user voice.

The controller 110 may include the processor 111. The controller 110 may include a non-volatile memory which includes read only memory (ROM) 112 that stores a control program for controlling the range hood 100 and a signal or data received from a source outside the range hood 100, or may include a volatile memory which includes random access memory (RANI) 113 that is used as a storage area with respect to various operations performed in the range hood 100.

The RAM 113 may be used as a storage area with respect to control information received from an external source, operation information of the range hood 100 or state information of the range hood 100. The processor 111 may include at least one of the ROM 112 and the RAM 113.

The controller 110 serves to control a signal flow between the overall operation of the range hood 100 and the internal components 110 to 195 of the range hood 100 and process data. The controller 110 may control the power supply to the internal elements 110 to 195 by using the power manager 195. The processor 111, the ROM 112, and the RAM 113 may be connected with one another by a bus.

The controller 110 may control the communicator 120, the camera 150, the sensor 160, the touch screen 170, the speaker 175, the LED 176, the first driver 180', the second driver 182', the storage 190, and the power manager 195.

The controller 110 may control a camera which is positioned inside the main body and photographs an upper plate of a cook top positioned under the main body through a bottom surface of the main body, so that a cooking process performed on the upper plate of the cook top is photographed.

The range hood may include a communicator which is positioned inside the main body and connects to an external device, and the controller 110 may control to transmit at least one of a photographed video and image to outside in response to the cooking process.

The main body may further include a duct and a first driver which absorbs at least one of smoke, cooking steam and cooking odor generated in the cooking process through the duct, and the controller may control to operate the first driver in response to photographing of the camera.

The main body may further include an auxiliary light source, and the controller 110 may control to operate the auxiliary light source in response to photographing of the camera.

The main body may further include a second driver, and the controller 110 may operate the second driver to control the camera to be cooled down.

The main body may further include a display on the front side, and the display may include a plurality of buttons. In addition, the controller may control the first driver to be operated in response to selection of a power button which is one of the plurality of buttons.

The main body may further include a display on the front side, and the display may include a plurality of buttons. In addition, the controller may control to wirelessly connect with the external device by using the communicator in response to selection of a wireless connection button which is one of the plurality of buttons.

The controller 110 may control the camera to photograph at least one of a state of the cook top and a state of a cooking container to be placed on the cook top.

The controller 110 may control to recognize at least one of a position and size of the cook top by using at least one of the photographed video and image.

The controller 110 may control to recognize at least one of a flame position and flame area of the cook top by using at least one of the photographed video and image.

The controller 110 may control to recognize a cooking container which is placed on the cook top by using at least one of the photographed video and image.

The controller 110 may control to recognize smoke generated from a cooking container placed on the cook top by using at least one of the photographed video and image.

The controller 110 may control to recognize a foreign substance that is attached to a glass positioned on the front side of the camera by using at least one of the photographed video and image.

The controller 110 may control to recognize the boiling water of the cooking container by using at least one of the photographed video and image.

According to an example embodiment, the term "controller of the range hood" may be a term which includes the processor 111, the ROM 112, and the RAM 113. In addition, "controller of the range hood" may refer to the processor 111.

The communicator 120 may connect with an external device 400 and 410-440 via a mobile communication network, a wireless local area network (LAN) communication network, or a near field communication network by using one antenna or two or more antennas under the control of the controller 110. The communicator 120 may be wirelessly connected with an external device 400 under the control of the controller 110. The external device 400 may include a portable device 410 including a smart phone, a display device 420 including a TV, home appliance 430 including an air conditioner and a washing machine, or a server 440.

The wireless LAN communication may be wirelessly connected with an access point (AP) at a location where the AP is installed under the control of the controller 110. For example, the wireless LAN communication may include a Wi-Fi communication. The near field communication may include a Bluetooth communication, a Bluetooth low energy communication, an infrared data association (IrDA) communication, a ultra-wideband (UWB) communication, a Wi-Fi direct, a magnetic security transmission (MST) communication and/or an near field communication (NFC) communication.

According to the various example embodiments, the term "communicator" may be connect with an external device via a mobile communication, a wireless LAN communication and/or near field communication.

The camera 150 may photograph a still image or record a video under the control of the controller 110. In an example embodiment, the term "image" may include a single image or multiple images (i.e., a video). In an example embodiment, a recorded image may include a series of images which are photographed at predetermined intervals (e.g., 100 ms, 1 sec, 3 sec, etc.) that may be modified or configured by a user.

The camera 150 may photograph a still image and a video in the direction from a bottom surface 10*b* of the range hood toward the upper plate 200*a* of the cook top 200 under the control of the controller 110.

The camera 150 may include a glass (or heat-resistant glass 151*a*, see FIG. 3) which is positioned on the front side of the lens and insulates from external heat and/or maintains camera photographing quality, a glass holder 151*b* (see FIG. 3) which fixes the glass 151*a* and forms an air insulation pocket layer, and/or a camera holder 151*c* (see FIG. 3) which fixes the camera 150.

The camera 150 may be positioned inside the main body 10. An opening may be formed in the bottom surface 10*b*. The camera 150 may photograph the upper plate 200*a* of the cook top 200 via the opening of the main body 10. The glass 151*a* may cover the opening. The camera 150 may photograph the upper plate 200*a* of the cook top 200 via the glass 151*a* which covers the opening of the main body 10.

A portion of the camera 150 may be exposed outside from the main body 10. In addition, the camera 150 may be protruded outside from the bottom surface 10*b* of the main body 10. The glass 151*a* may be fixed to at least one of the main body 10 and the glass holder 151*b* to correspond to the camera 150 projected outside the bottom surface 10*b* of the main body 10. The second driver 182' may be positioned on the rear side of the camera 150. A cooling tube 10*c* which is connected with the duct 14 may be positioned on the rear side of the camera 150. The opening of the bottom surface 10*b* to which the glass 151*a* is not added may be connected with the duct 14 via the cooling tube 10*c*.

The camera 150 may photograph a cooking process and/or a cooking situation using at least one of a still image and a video. The camera 150 may include a first camera 150 which is positioned on the bottom surface 10*b* of the range hood 100 and a second camera (not illustrated) which photographs an appearance of the user from the front surface 10*a* of the range hood 100.

An optical axis of the camera 150 may be inclined at a setting angle (e.g., 65 degrees or less, see FIG. 3) in the counterclockwise direction with respect to the bottom surface 10*b* of the range hood 100. The above-mentioned setting angle may be 75 degrees or less or may be 10 degrees or more. In addition, the above-mentioned setting angle may be 60 degrees or less or may be 3 degrees or more.

The camera 150 may include an auxiliary light source (e.g., flash (not illustrated)) which provides an amount of light required for photographing. In addition, the camera 150 may be provided with an amount of light required for photographing via the LED 176.

The controller 110 may provide power supply to the LED 176 in response to photographing of the camera 150. In addition, the controller 110 may provide power supply (LED auto on) to the LED 176 in response to a photographing start time of the camera 150.

The controller 110 may control the storage 190 to store at least one of a video and image photographed through the camera 150. The controller 110 may control the storage 190 to store a video and image photographed through the camera 150 together or individually.

The controller 110 may transmit at least one of a video and an image photographed to a portable device 410 by using the communicator 120. The controller 110 may transmit at least one of a pre-stored video and image to an external device 400 by using the communicator 120.

The sensor 160 may detect a peripheral state (e.g., illuminance) of the range hood 100 and/or an internal state (e.g., temperature of storage chamber) of the range hood 100 through one or a plurality of sensors.

The sensor 160 may include a temperature sensor 161 which detects a temperature of a cooking container 1 (or an object to be cooked) placed on the upper plate 200*a* of the cook top 200 and/or a smoke sensor 162 which senses smoke and/or vapors generated from a cooking container 1 (or an object to be cooked) placed on the upper plate 200*a* of the cook top 200. In addition, the sensor 160 may include an illuminance sensor (not illustrated) corresponding to a brightness change of the touch screen 170 and/or lighting (or off) of the LED 176. It would be easily understood by those skilled in the art that a sensor type included in the sensor 160 may be added, modified or deleted according to a performance of the range hood 100.

A touch screen may provide (or display) a GUI corresponding to various services (e.g., data transmission, displaying of an application, broadcast reception, viewing a photographed video (or image), viewing a video content or electronic payment including mobile payment). In an example embodiment, a display may be a concept which includes a touch screen.

The touch screen 170 may include a touch panel 172 which receives a user input (e.g., touch) and a display panel 171 for displaying a screen. In the touch screen 170, the display panel 171 and the touch panel 172 may be implemented as integral-type (e.g., in-cell type touch screen or on-cell type touch screen).

The touch screen 170 may include an edge touch screen (not illustrated) having a curvature. The edge touch screen may include an edge touch panel (not illustrated) which receives a user input and an edge display panel (not illustrated) for displaying a screen. The edge touch panel and the edge display panel may be implemented as integral-type as described above.

The touch screen 170 may transmit an analog signal corresponding to a single touch (or multi-touch) that is input through a home screen (not illustrated) or GUI to a touch screen controller (not illustrated). The touch screen 170 may receive a single touch or multi-touch through a body (e.g., fingers including a thumb) of the user or an input pen (e.g., stylus, not illustrated).

According to an example embodiment, a touch screen 170 (or a display) may output visual feedback corresponding to photographing of at least one of a cooking process, a state of a cook top and a state of a cooking container through the camera 150. In an example embodiment, the display may be a concept which includes the touch screen 170.

A touch screen controller (not illustrated) converts an analog signal corresponding to a touch (single touch or multi-touch) received from the touch screen 170 into a digital signal, and transmits the digital signal to the controller 110. The controller 110 may calculate a position (e.g., x coordinate and y coordinate) of a touch received by the touch screen 170 by using the digital signal received from the touch screen controller (not illustrated).

The controller 110 may control the touch screen 170 by using the digital signal received from the touch screen controller (not illustrated). For example, in response to an input touch, the controller 110 may display a shortcut icon (or referred to as icon) selected from among shortcut icons corresponding to applications displayed on the touch screen 170 distinctively from other shortcut icons that are not selected, or may display an application (e.g., video application) corresponding to the selected shortcut icon.

The speaker 175 may output sound corresponding to various signals (e.g., broadcast signal, audio source, video file or photo photographing) decoded by an audio codec under the control of the controller 110. One speaker 175 or two or more speakers 175 may be provided.

According to an example embodiment, the speaker 175 (or touch screen) may output auditory feedback corresponding to photographing of at least one of a cooking process, a state of a cook top and a state of a cooking container through the camera 150.

The first driver 180' may include a first motor 180 which is operated under the control of the controller 110, and a first fan 181. The first driver 180' may be positioned within a duct 14 of the range hood 100. The smoke, cooking steam and/or cooking odor which are generated in the process of cooking may be absorbed by the first driver 180' and discharged outside.

A rotating speed of the first motor 180 (or first fan 181) may be modified under the control of the controller 110.

The second driver 182' may include a second motor 182 and a second fan 183. The second driver 182' may be positioned on the rear side (e.g., z-axis direction) of the camera 150. A cooling tube 10*c* which is connected with the duct 14 may be positioned on the rear side of the camera 150. The second driver 182' may be positioned between the camera 150 and the cooling tube 10*c*. A sectional shape, length and/or the degree of bending of the cooling tube 10*c* may be modified according to a structure (or performance) of the range hood 100.

A temperature of the camera 150 and/or a temperature of glass may be cooled by the second driver 182'. A rotating speed of the second motor 182 (or second fan 183) may be modified under the control of the controller 110. The second driver 182' may be implemented as a direct current (DC) fan. In addition, the second driver 182' may be selectively installed or may not be installed in the range hood 100 (e.g., see FIG. 8A).

The storage 190 may store a signal or data (e.g., corresponding to an image (or video) of a cooking process) that is inputted or outputted to correspond to an operation of elements 110-195 under the control of the controller 110. The storage 190 may store a control program for controlling the range hood 100 or the controller 110 and an application (e.g., camera application, etc.) provided by the manufacturer or downloaded from an external source, a GUI related to the application, images corresponding to the GUI, user information, document, database or relevant data.

The storage 190 may store an image (or video) of a cooking process photographed by the camera 150. The image (or video) of a cooking process may be a concept which includes a binary file corresponding to one or a plurality of images displayed on the touch screen 170 and/or one or a plurality of images stored in the storage 190.

The storage 190 may store visual feedback (e.g., video source, etc.) which may be outputted to correspond to photographing of at least one of a cooking process, a state of the cook top and a state of a cooking container and recognized by the user and auditory feedback (e.g., sound source, etc.) which is outputted from speaker 175 and recognized by the user.

The storage 190 may store a feedback providing time (for example, 500 ms) of the feedback provided to a user.

In an example embodiment, the term "storage" includes the storage 190, the ROM 112 within the controller 110, the RAM 113 or a memory card (e.g., micro secure digital (SD)

card, etc., not illustrated) which is mountable in a slot (not illustrated) of the main body 10 of the range hood 100. The storage 190 may include the non-volatile memory, the volatile memory, a hard disk drive (HDD) or a solid state drive (SSD).

The power manager 195 may provide power supply to elements 110-195 of the range hood 100 under the control of the controller 110. The power manager 195 may supply power which is input from an external power source to each element of the range hood 100 via a power code (not illustrated) under the control of the controller 110.

A microphone (not illustrated) may generate (or convert) a voice or sound which is received from an external source to an electric signal under the control of the controller 110. The electric signal which is generated by the microphone may be converted in an audio codec under the controller of the controller 110 and stored in the storage 190 or outputted through the speaker 175. The controller 110 may control such that a self-voice recognition application or an external voice recognition application (or external server) performs voice recognition by using the received voice (or sound).

The portable device 410 and the display device 420 may be connected to the range hood 100 via a communicator (not illustrated). The external device 400 may, directly or via another device (e.g., cook top, etc.), receive a video (or image) corresponding to a cooking process and/or cooking situation photographed by the range hood 100 through the communicator (not illustrated). The external devices 410-440 are merely examples, and any entity which is capable of receiving a video (or image) corresponding to a cooking process and/or cooking situation photographed by the range hood 100 through a communicator (not illustrated) would work similarly.

The external device 400 may display the received video (or image) on a display (not illustrated). The external device 400 may include elements (e.g., controller (not illustrated), communicator (not illustrated), display (not illustrated), speaker (not illustrated), storage (not illustrated), power manager (not illustrated), etc.) for receiving and/or reproducing (or displaying) a video (or image). The above-listed elements of the external device 400 are similar to the elements 110-195 of the range hood 100 and thus, detailed description thereof may be omitted herein.

The above-listed elements of the external device 400 are merely examples, and those skilled in the art would understand that at least one of the elements may be added, deleted or modified according to a structure, function and performance of the external device.

In addition, those skilled in the art would understand that at least one of the elements of the range hood 100 illustrated in FIGS. 1A to 2A may be added, deleted or modified according to a performance of the range hood 100.

Referring to FIGS. 2C and 2D, the range hood 100 may be connected with the external device 400 via the cook top 200 by using the communicator 120. The range hood 100 may transmit a video (or image) which is photographed by the cook top 200 by using the communicator 120, and the cook top 200 may transmit the received video (or image) to the external device 400.

The range hood of FIG. 2C is substantially the same as the range hood of FIG. 2A and thus, detailed description thereof will be omitted herein. The external device of FIG. 2C is substantially the same as the external device of FIG. 2A and thus, detailed description thereof will be omitted herein.

The range hood 100 may transmit a photographed (or pre-stored) video (or image) to the cook top 200 by using the communicator 120. The range hood 100 may directly transmit a photographed (or pre-stored) video (or image) to the cook top 200 by using the communicator 120 without passing through an external device.

The cook top 200 may be positioned under the range hood 100. The cook top 200 may be implemented alone or may be implemented as an oven range which includes an oven at the bottom.

Referring to FIG. 2C, the cook top 200 may be directly connected with an external device 400 by using a communicator 220. The cook top 200 may be connected with the external device 400 by using an AP (not illustrated) and/or P2P method. The external device 400 may include a portable device 410 including a smart phone, a display device 420 including a TV, home appliance 430 including an air conditioner and a washing machine, or a server 440.

The cook top 200 may transmit operation information corresponding to an operation (e.g., cooking through a heating unit 280, etc.) or state information corresponding to corresponding to a state (e.g., normal, abnormal, etc.) of the cook top 200 to the range hood 100 and/or the external device 400, or may receive control information (e.g., control command corresponding to an operation of the heating unit 280 of the cook top 200) from an external source.

The cook top 200 may have a main body and accommodate a part of elements (e.g., 210 to 295) in the main body. A part of the elements (e.g., 210 to 295) may be exposed outside the main body.

The cook top 200 may include a controller 210, a communicator 220, a camera 250, a temperature sensor 260, a touch screen 270, a speaker 275, a heating unit 280, a storage 290, and a power manager 295. The main body of the cook top 200 may include a controller 210, a communicator 220, a camera 250, a temperature sensor 260, a touch screen 270, a speaker 275, a heating unit 280, a storage 290, and a power manager 295. The cook top 200 may include a sensor (e.g., overheating sensor (not illustrated), etc.). In addition, the cook top 200 may further include a microphone (not illustrated) which receives a user voice.

The controller 210 may include a processor 211. The controller 210 may store a non-volatile memory which includes ROM that stores a control program for controlling the cook top 200 and a volatile memory which includes RAM 213 that stores a signal or data inputted from outside the cook top 200 or is used as a storage area with respect to various operations performed on the cook top 200.

The RAM 213 may be used as a storage area with respect to control information received from an external source, operation information of the cook top 200 or state information of the cook top 200. The processor 211 may include at least one of the ROM 212 and the RAM 213. Further, the processor 211 may include at least one of the ROM 212 and the RAM 213.

The controller 110 serves to control a signal flow between the overall operation of the cook top 200 and the internal components 210 to 295 of the cook top 200 and process data. The controller 210 may control the power supply to the internal elements 210 to 295 by using the power manager 295. The processor 211, the ROM 212, and the RAM 213 may be connected with one another by a bus.

The controller 210 may control a controller 210, a communicator 220, a camera 250, a temperature sensor 260, a touch screen 270, a speaker 275, a heating unit 280, a storage 290, and a power manager 295.

According to an example embodiment, the term "controller of a cook top" as used herein may be a concept which includes the processor 211, the ROM 212, and the RAM 213. In addition, "controller of a cook top" may refer to the processor 211.

The communicator 220 may connect with the range hood 100 and the external devices 400 and 410-440, respectively, via a mobile communication network, a wireless LAN communication network, or a near field communication network by using one antenna or two or more antennas under the control of the controller 210.

The wireless LAN communication may be wirelessly connected with an AP at a location where the AP is installed under the control of the controller 210. For example, the wireless LAN communication may include a Wi-Fi communication. The near field communication may include a Bluetooth communication, a Bluetooth low energy communication, an infrared data association (IrDA) communication, a ultra-wideband (UWB) communication, a Wi-Fi direct, a magnetic security transmission (MST) communication and/or an NFC communication.

According to the various example embodiments, the term "communicator" may be connect with an external device via a mobile communication, a wireless LAN communication and/or near field communication.

The camera 250 may photograph a still image or video corresponding to a cooking process and/or cooking situation on the upper plate 200a of the cook top 200 under the control of the controller 110. The camera 250 may be positioned in the front of the operation panel 330.

The camera 250 may include an auxiliary (e.g., flash (not illustrated) which provides an amount of light required for photographing. In addition, the camera 250 may be provided with an amount of light required for photographing via an LED 176 of the range hood 100.

The controller 210 may control the storage 290 to store a video (or image) which is photographed through the camera 250.

The temperature sensor 260 may detect a temperature of a cooking container 1 (or object to be cooked) placed on the upper plate 200a of the cook top 200. A smoke sensor (not illustrated) which detects smoke generated from a cooking container 1 (or object to be cooked) placed on the upper plate 200a of the cook top 200 may be included. It would be easily understood by those skilled in the art that a sensor type included in the cook top 200 may be added, modified or deleted according to a performance of the cook top 200.

A touch screen 270 (or a display) may provide (or display) a GUI corresponding to various services (e.g., data transmission, displaying of an application or viewing of a photographed video (or image). In an example embodiment, a display may be a concept which includes a touch screen.

The touch screen 270 may include a touch panel 272 which receives a user input (e.g., touch) and a display panel 271 for displaying a screen. In the touch screen 270, the display panel 271 and the touch panel 272 may be implemented as integral-type (e.g., in-cell type touch screen or on-cell type touch screen).

The touch screen 270 may include an edge touch screen (not illustrated) having a curvature. The edge touch screen may include an edge touch panel (not illustrated) which receives a user input and an edge display panel (not illustrated) for displaying a screen. The edge touch panel and the edge display panel may be implemented as integral-type as described above.

The touch screen 270 may transmit an analog signal corresponding to a single touch (or multi-touch) inputted through a GUI to a touch screen controller (not illustrated). The touch screen 270 may receive a single touch or multi-touch through a body (e.g., fingers including a thumb) of the user or an input pen (e.g., stylus, not illustrated).

A touch screen controller (not illustrated) converts an analog signal corresponding to a touch (single touch or multi-touch) received from the touch screen 270 into a digital signal, and transmits the digital signal to the controller 210. The controller 210 may calculate a position (e.g., x coordinate and y coordinate) of a touch received by the touch screen 270 by using the digital signal received from the touch screen controller (not illustrated).

The controller 210 may control the touch screen 270 by using the digital signal received from the touch screen controller (not illustrated). For example, in response to an input touch, the controller 210 may display a shortcut icon (or referred to as icon) selected from among shortcut icons corresponding to applications displayed on the touch screen 270 distinctively from other shortcut icons that are not selected, or may display an application (e.g., video application) corresponding to the selected shortcut icon.

The speaker 275 may output sound corresponding to various signals (e.g., broadcast signal, audio source, video file or photo photographing) decoded by an audio codec under the control of the controller 110. One speaker 275 or two or more speakers 175 may be provided.

The heating unit 280 may include a burner (a gas burner or an electric burner, not illustrated) and/or an induction coil (not illustrated) which heats a cooking container 1 placed on the upper plate 200a of the cook top 200 under the control of the controller 110. A burner or induction coil for heating the cooking container 1 described above may be referred to as a fuel intake.

The storage 290 may store a signal or data (e.g., corresponding to a video (or image) of a cooking process) which is inputted or outputted to correspond to an operation of the elements 210 to 295 under the control of the controller 210. The storage 190 may store a control program for controlling the cook top 200 or the controller 110 and an application (e.g., camera application, etc.) provided by the manufacturer or downloaded from an external source, a GUI related to the application, images corresponding to the GUI, user information, document, database or relevant data.

The storage 290 may store a video (or image) of a cooking process which is photographed by using the camera 250. The video (or image) of a cooking process may be a concept which includes a binary file corresponding to one or a plurality of images displayed on the touch screen 270 and/or one or a plurality of images stored in the storage 290. In addition, the storage 290 may store a video (or image) of a cooking process which is received from the range hood 100.

According to an example embodiment, the term "storage" may include the storage 290, ROM 212 and RAM 213 of the controller 210, and a memory card (e.g., micro SD card and universal serial bus (USB) memory, not illustrated) which is mountable in a slot of the operation panel 330 of the range hood 100. The storage 290 may include the non-volatile memory, the volatile memory, an HDD or an SSD.

The power manager 295 may provide power supply to the elements 210 to 295 of the cook top 200 under the control of the controller 110. The power manager 295 may supply power which is input from an external power source to each element of the cook top 200 via a power code (not illustrated) under the control of the controller 210.

A microphone (not illustrated) may generate (or convert) a voice or sound which is received from an external source to an electric signal under the control of the controller 210. The electric signal which is generated by the microphone may be converted in an audio codec under the controller of the controller 210 and stored in the storage 290 or outputted through the speaker 275. The controller 210 may control such that a self-voice recognition application or an external voice recognition application (or external server) performs voice recognition by using the received voice (or sound).

In addition, it would be easily understood by those skilled in the art that at least one of the elements of the range hood 100 illustrated in FIGS. 1A to 2B may be added, deleted or modified according to a performance of the cook top 200.

Figure 3:
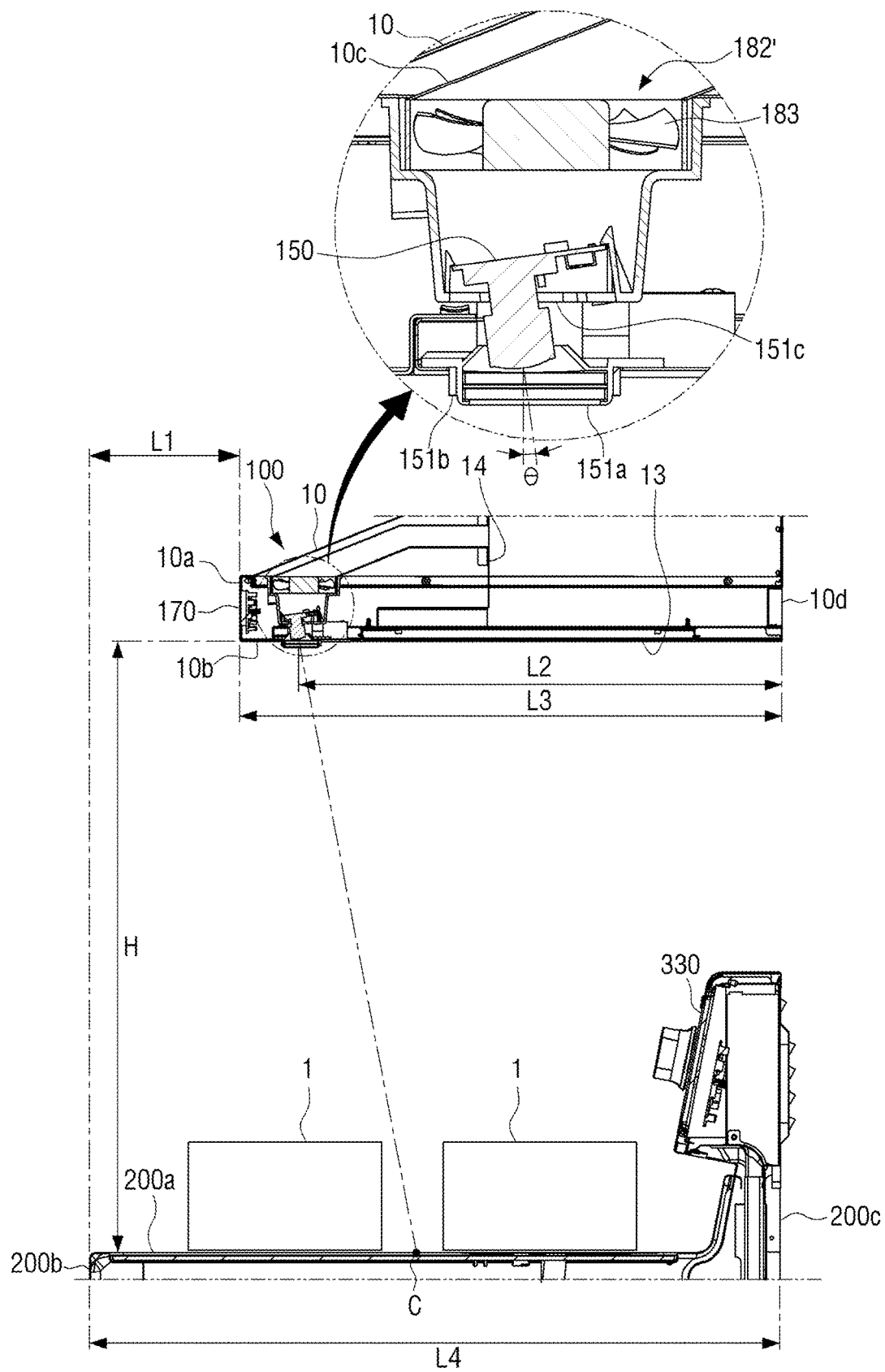
FIG. 3 is a sectional view illustrating a range hood having a camera according to various embodiments of the present disclosure.

FIG. 3 is a sectional view illustrating a range hood having a camera according to various embodiments of the present disclosure.

Referring to FIG. 3, a bottom surface 10b of the range hood 100 may be positioned at a distance H away from the upper plate 200a of the cook top 200. The spaced distance H may be greater than 60 cm. In addition, the spaced distance H may be less than 99 cm. The spaced distance H may be different according to at least one of a type of the cook top (e.g., a gas range, an electric range, an induction range or a hybrid range which is a combination of electric range and induction range) and a first driver 180'.

When a virtual vertical line is drawn from the front surface 10a of the range hood 100 to the upper plate 200a of the cook top 200, the front surface 10a of the range hood 100 may be positioned on top of the upper plate 200a of the cook top 200.

A distance L3 from a rear surface 10d (or wall (not illustrated)) of the range hood 100 to a front surface 10a of the range hood 100 is longer (larger) than a distance L2 from a rear surface (or wall) of the range hood 100 to a camera 150 of the range hood 100. A distance L4 from a rear surface 200c (or wall) of the cook top 200 to a front surface 200b of the cook top 200 is longer (larger) than a distance L3 from a rear surface 10d (or wall) of the range hood 100 to a front surface 10a of the range hood 100.

A distance L2 from a rear surface 10d (or wall) of the range hood 100 to a camera 150 of the range hood 100 is longer (larger) than a distance L1 from a front surface 10a of the range hood 100 to a front surface 200b of the cook top 200. A front surface 10a of the range hood 100 may be positioned behind (e.g., in the −y-axis direction) a front surface 200b of the cook top 200 with respect to a wall (not illustrated).

When a front surface 200b of the cook top 200 is positioned behind a front surface 10a of the range hood 100, an optical axis of the camera 150 may be inclined with respect to an upper plate 200a of the cook top 200.

An optical axis of the camera 150 may correspond to a center point C that is a half of a distance L4 from a rear surface 200c (or wall) of the cook top 200 to a front surface 200b of the cook top 200. In addition, an optical axis of the camera 150 may correspond to a center point (e.g., an intersection of the straight lines connecting four corners of the upper plate 200a (not illustrated)) of the upper plate 200a of the cook top 200. A center point C which is a half of a distance L4 from a rear surface 200c (or wall) of the cook top 200 to a front surface 200b of the cook top 200 and a center point of the upper plate 200a of the cook top 200 may be at different positions.

An optical axis inclination (θ) of the camera 150 may be represented by the following mathematical equation.

$$\theta = \tan^{-1}\left[\frac{L2 - (L4/2)}{H}\right] \quad \text{Equation 1}$$

Here, H refers to a distance from an upper plate 200a of the cook top 200 to a bottom surface 10b of the range hood 100, and L2 refers to a distance from a rear surface (or wall) of the range hood 100 to a camera 150 of the range hood 100. In addition, L4 refers to a distance from a rear surface (or wall) of the cook top to a front surface 200b of the cook top 200.

When a front surface 200b of the cook top 200 is positioned behind a front surface 10a of the range hood 100, an optical axis of the camera 150 may be inclined by a setting angle θ (e.g., 15° or less) with respect to a virtual line vertically extending from an upper plate 200a of the cook top 200. An optical axis inclination θ of the camera 150 may be changed according to at least one of a value of H, a value of L2 and a value of L4 described above.

Figure 4:
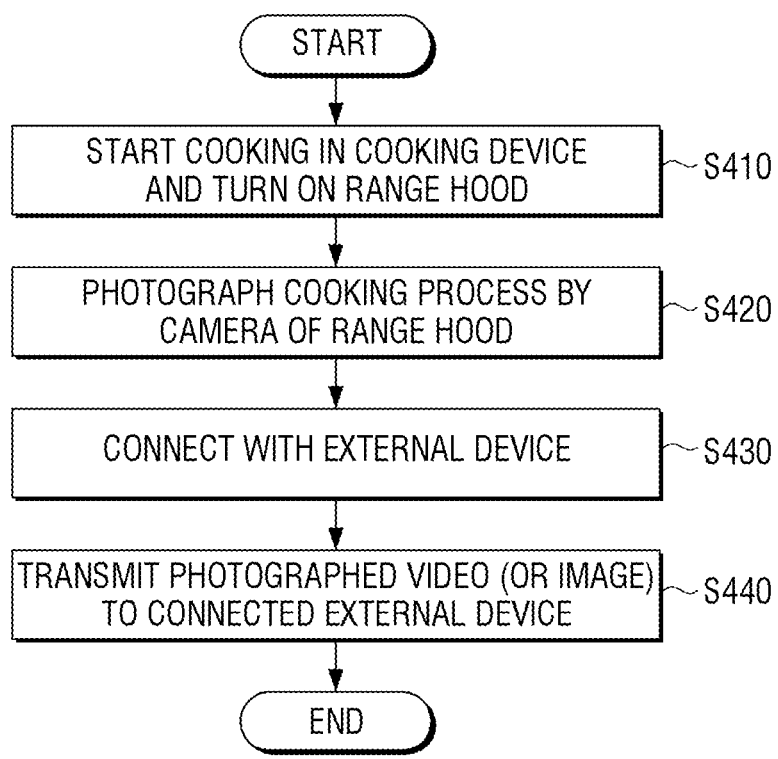
FIG. 4 is a flowchart illustrating a method for controlling a range hood having a camera according to an embodiment of the present disclosure.

FIG. 4 is a flowchart illustrating a method for controlling a range hood having a camera according to an embodiment of the present disclosure.

FIGS. 6A, 6B, 6C, 6D, 6E, and 6F are diagrams illustrating an example of a method of controlling a range hood having a camera, according to an embodiment of the present disclosure.

Referring to FIG. 4, in operation S410 of FIG. 4, cooking starts in the cooking device and the power of a range hood are turned on (or power is supplied to the range hood).

Figure 6A:
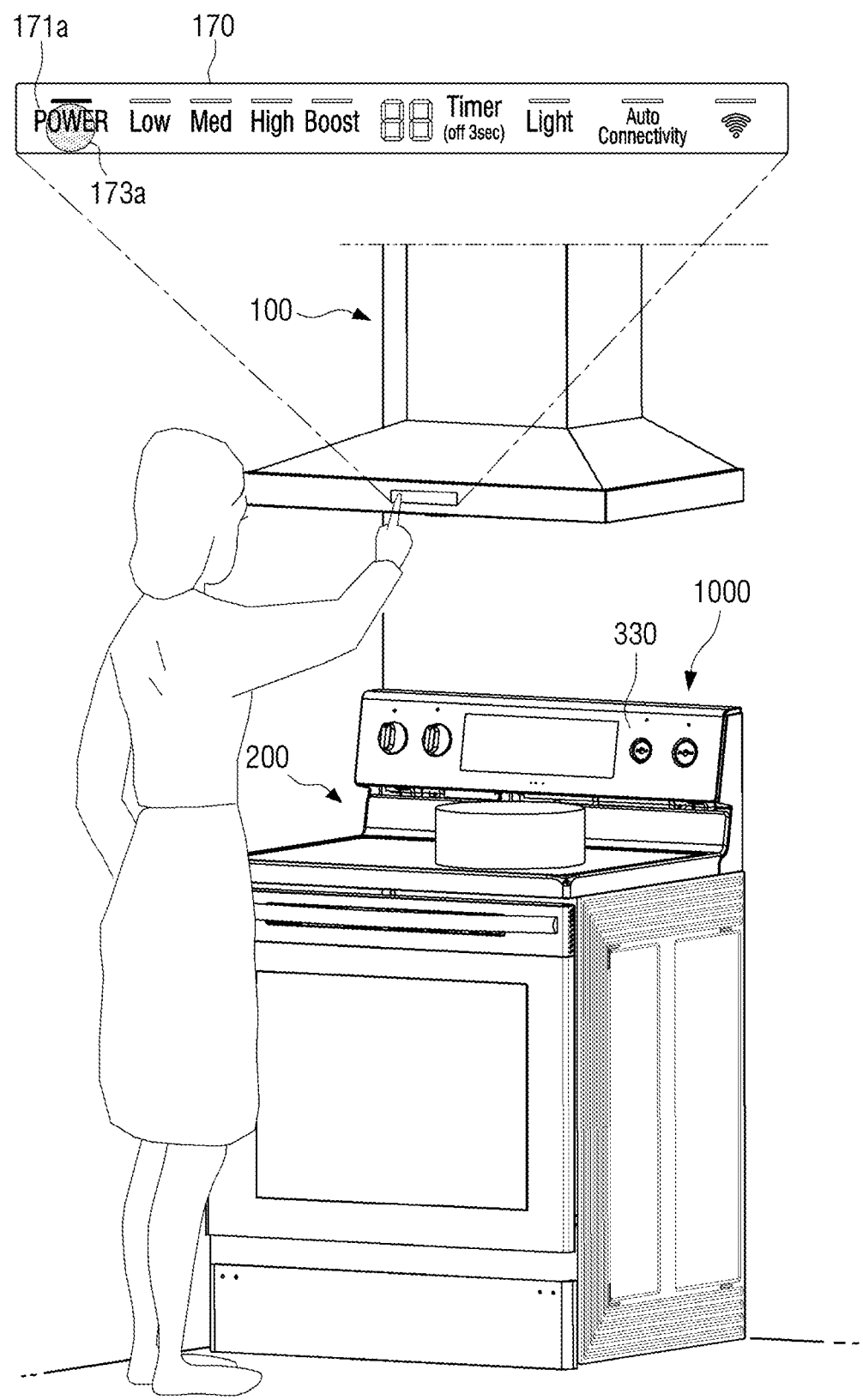
FIGS. 6A, 6B, 6C, 6D, 6E, and 6F are diagrams illustrating an example of a method of controlling a range hood having a camera, according to an embodiment of the present disclosure.

Referring to FIG. 6A, a user may start cooking with respect to a cooking container 1 placed on an upper plate 200a of a cook top 200 (or cooking device) by using an operation panel 330. The user may input a cooking option (e.g., select at least one burner, an intensity of the burner (or thermal power of the burner, timer, etc.) with respect to the cooking container 1 through the operation panel 330.

The user may supply power to the range hood 100. The user may select 173a (or touch) a power button 171a of a touch screen 170. A controller 110 of a range hood 100 may detect a user selection 173a (touch) by using a touch screen 170 and a touch screen controller (not illustrated). The controller 110 may supply power to the range hood 100 in response to the user input 173a.

In operation S420 of FIG. 4, a cooking process is photographed by a camera of the range hood.

Figure 6B:
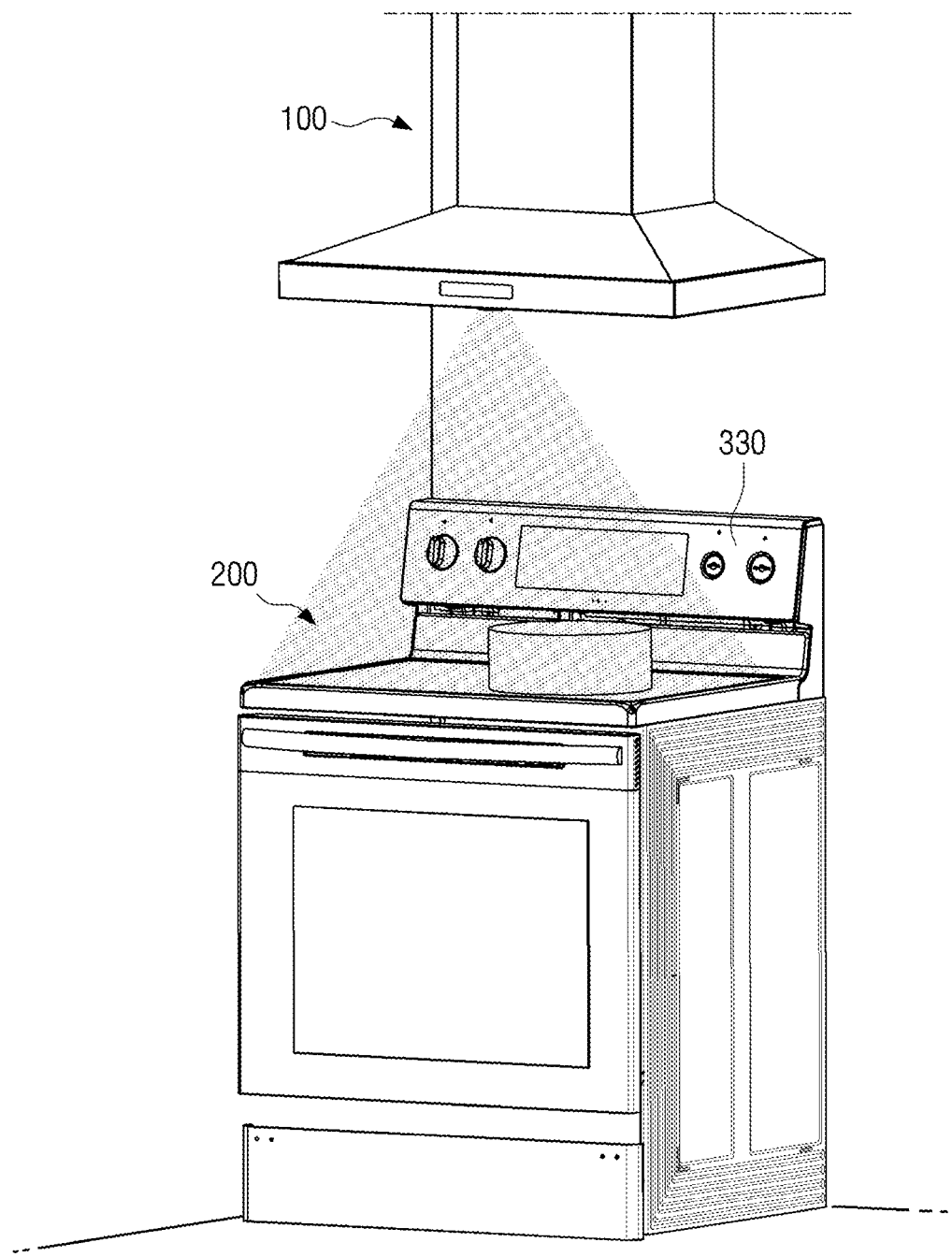

Referring to FIG. 6B, the camera 150 of the range hood 100 may photograph (at least one of a still image and video) a cooking process performed on the cook top 200 positioned at the bottom. In response to power supply of the range hood 100, the controller 110 may control the camera 150 to start photographing (e.g., automatically). In addition, the controller 110 of the range hood 100 powered on may manually control the camera 150 to start photographing according to a selection of a button 170k by the user.

The camera 150 may have an angle of view capable of photographing an upper plate 200a of the cook top 200. The camera 150 may have an angle of view which is capable of photographing an upper plate 200a and operation panel 330 of the cook top 200.

The camera 150 may photograph a part (e.g., a few seconds after cooking starts, a few seconds after a periodic time interval (e.g., 1 min or 30 sec), a few seconds before cooking completes, some seconds after cooking completes) of a cooking process or a whole cooking process as a still image or a video. The camera may photograph a cooking situation (e.g., overheating of a cooking container (or object to be cooked), over cook, or whether or not smoke is generated) as a still image or a video.

During photographing of the camera 150, the controller 110 may detect a temperature of a cooking container 1 (or object to be cooked) placed on the upper plate 200a of the cook top and/or smoke which is generated from the cooking container 1 (or object to be cooked) placed on the upper plate 200a of the cook top. When a sensor 160 detects an abnormality (e.g., over heat, detection of smoke, etc.) during a cooking process and/or a cooking situation, the controller 110 may provide the user a warning (or alarm) through a touch screen 170 and/or a speaker 175.

The controller 110 may perform a video recognition (or image recognition) using a photographed video (or image).

According to an example embodiment, the controller 110 may recognize a position size and/or boundary of the cook top 200 by using a photographed video (or image). The controller 110 may recognize a position, size and/or boundary of an upper plate 200a of the cook top 200 by using a photographed video (or image). Regarding a video (or image) photographed through the camera 150, the controller 110 may differently recognize a relative size, position (e.g., tilt) and/or shape (e.g., rectangle or trapezoid) of the cook top 200 (or upper plate (200a) according to an optical axis inclination θ.

The controller 110 may determine (or recognize) a position, size and/or boundary of the cook top 200 (or upper plate 200a) by matching a photographed video (or image) and an image of the cook top 200 that is pre-stored. The controller 110 may determine (or recognize) a position, size and/or boundary of the cook top 200 (or upper plate 200a) by using a contour detection algorithm.

When a position of the cook top 200 (or upper plate 200a) is determined, the controller 110 may correct (e.g., crop a background due to tilting) tilting of the cook top 200. When a position of the cook top 200 (or upper plate 200a) is determined, the controller 110 may correct (e.g., rotational correction) an angle of the cook top 200. When a position of the cook top 200 (or upper plate 200a) is determined, the controller 110 may correct (e.g., correct a trapezoid to a rectangle) a shape of the cook top 200. In addition, when a position of the cook top 200 (or upper plate 200a) is determined, the controller 110 may notify (e.g., sound such as an alarm, etc.) the user of "the cook top 200 is invisible" in the photographed video (or image).

According to an example embodiment, the controller 110 may recognize a position of a fuel intake (e.g., a heating area (not illustrated) corresponding to a burner or an induction coil) and/or a fuel intake area of the cook top 200 by using a photographed video (or image).

The controller 110 may recognize (or distinguish) a burner and a metal grate supporting a cooking container on the burner, respectively, by using a photographed video (or image). In addition, the controller 110 may recognize (or distinguish) a heating area guide located on an upper plate of an induction range (which, for example, is located on an upper plate on an induction coil and indicates a heating area heated by the induction area in a circular (or polygonal) shape) by using a photographed video (or image). The controller 110 may determine the number of flame intakes of the cook top 200 by using a photographed video (or image).

According to an example embodiment, the controller 110 may recognize a cooking container 1 which is placed on the upper plate 200a of the cook top 200 by using a photographed video (or image).

The controller 110 may recognize (or distinguish) a flame intake and a cooking container 1 on the flame intake (or on a metal grate) by using a photographed video (or image). For example, the controller 110 may recognize (or distinguish) an opening or closing (e.g., whether a cooking container is placed on a flame intake) of a flame intake from a photographed video (or image). The controller 110 may recognize (or distinguish) an opening or closing of a flame intake by matching a photographed video (or image) with an image of the flame intake that is pre-stored. In addition, the controller 110 may recognize (or distinguish) the placement of a cooking container 1 by using a photographed video (or image) of the cooking container 1 that is pre-stored.

According to an example embodiment, the controller 110 may recognize whether or not a flame intake (e.g., corresponding to heating of a cooking container 1) of the cook top 200 is operated by using a photographed video (or image). In addition to the photographing of the camera 150, the controller 110 may receive operation information corresponding to an operation (e.g., burner on/off) of a knob (see FIG. 1) in an operation panel 330 of the cook top 200 via a communicator 120.

The controller 110 may confirm whether or not a cooking operation (e.g., boiling of water, steam generation or smoke generation) is performed in the cook top 200 through the received operation information. For example, the controller 110 may recognize boiling of water contained in the cooking container 1 by using a photographed video (or image). The controller 110 may recognize the boiling of water contained in the cooking container 1 by using (e.g., bubble generation detection algorithm) a photographed video (or image). In addition, the controller 110 may recognize the boiling of water contained in the cooking container 1 by using (e.g., detecting a difference of a red, green, blue (RGB) value of a pixel corresponding to a foam generation) a photographed video (or image).

The controller 110 may control a first driver 180' and/or a second driver 182' to be operated in response to the boiling of water.

According to an example embodiment, the controller 110 may recognize (or distinguish) whether or not smoke is generated in the cook top 200 by using a photographed video (or image). The colors of smoke include white, gray or black. In addition, the colors of smoke may include a combination of white, gray and black. The controller 110 may recognize (or distinguish) whether or not smoke is generated in the cook top 200 by using a difference (or color difference) of a RGB value of a pixel in a photographed video (or image). The controller 110 may recognize (or distinguish) whether or not smoke is generated in the cook top 200 by using a photographed video (or image) or a smoke detection algorithm.

The controller 110 may control a first driver 180' and/or a second driver 182' in response to the generation of smoke.

According to an example embodiment, the controller 110 may recognize (or distinguish) fogging of a glass 151a positioned on the front side of the camera 150 by using a photographed video (or image). The controller 110 may recognize fogging by comparing Laplacian values with respect to a foggy (or blurred) area in a photographed video (or image).

The controller 110 may control at least one of the first driver 180' and the second driver 182' to be operated in response to the generation of fogging in the glass 151a. When the fogging generated in the glass 151a is removed by an operation of a driver (at least one of 180' and 182'), the controller 110 may control a driver (180' or 182') that is operated to stop operating.

According to an example embodiment, the controller 110 may recognize (or distinguish) a foreign object in a glass 151a positioned on a front side of the camera 150 by using a photographed video (or image). The recognition (or distinguishing) of a foreign object attached to a glass 151a is similar to the recognition (or distinguishing) of fogging of the glass described above, and thus, detailed description thereof will be omitted herein.

The controller 110 may perform video recognition (image recognition) by using an external device 400. The controller 110 may perform video recognition (image recognition) by using a part (e.g., 410, 440, etc.) of an external device 400. In addition, the controller 110 may perform a voice recognition (or image recognition) by using a combination of external devices 410 to 440.

The storage 190 may store a video (or image) which is photographed through the camera 150 under the control of the controller 110.

In operation S430 of FIG. 4, an external device is connected.

Figure 6C:
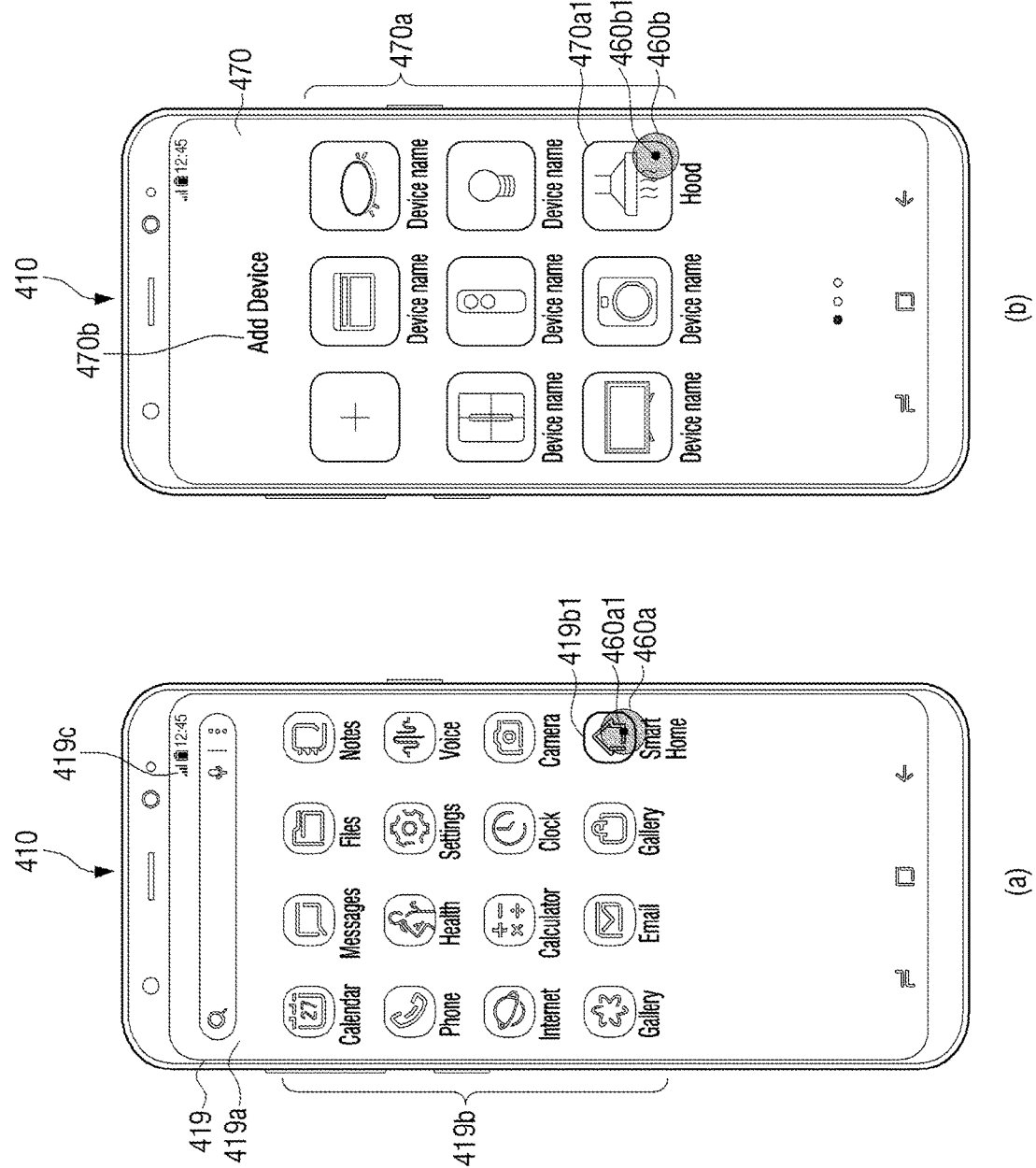

Referring to (a) of FIG. 6C, a shortcut icons 419*b* corresponding to applications selectable by a user touch (e.g., including hovering) and/or a widget (not illustrated) may be displayed on a home screen 419*a* of a touch screen 419 of a portable device 410. A status bar 419*c* for displaying a status of the portable device 410, such as a battery charging state, an intensity of a reception signal, and a current time, may be displayed on an upper end of the home screen 419*a*. In addition, a home screen 419*a* of the portable device 410 may be positioned on a lower end of the status bar 419*c* or the status bar 419*c* may not be displayed and only the home screen 419*a* may be displayed.

A user input 460*a* (e.g., touch or hovering) may be received in a shortcut icon 419*b*1 corresponding to an application (e.g., 'smart home') capable of controlling a range hood 100 and/or a cook top 200 from among shortcut icons 419*b* of applications that are selectable. The application ('smart phone') which is capable of controlling the range hood 100 and/or the cook top 200 may be pre-installed (or installed) in the portable device 410 or may be downloaded by a user.

Referring to (b) of FIG. 6C, a controller (not illustrated) of the portable device 410 may detect a user input 460*a* by using a touch screen 419 and a touch screen controller (not illustrated). A controller (not illustrated) of the portable device 410 may calculate a position 460*a*1 (e.g., X1 coordinate and Y1 coordinate) of a user input corresponding to a user input 460*a* by using an electric signal received from a touch screen controller (not illustrated).

A controller (not illustrated) of the portable device 410 may display an application screen 470 which corresponds to the shortcut icons 419*b* in response to receiving a user input 460*a*. The name of the application screen 470 may be 'Add Device 470*b*'. The application screen 470 may display shortcut icons 470*a*, which correspond to an electronic device that is to be added (or controlled) to the application ('smart home').

A user input 460*b* (e.g., touch or hovering) may be received in a shortcut icon 470*a*1 corresponding to the range hood 100 from among the shortcut icons 470*a* of an application that are selectable.

Figure 6D:
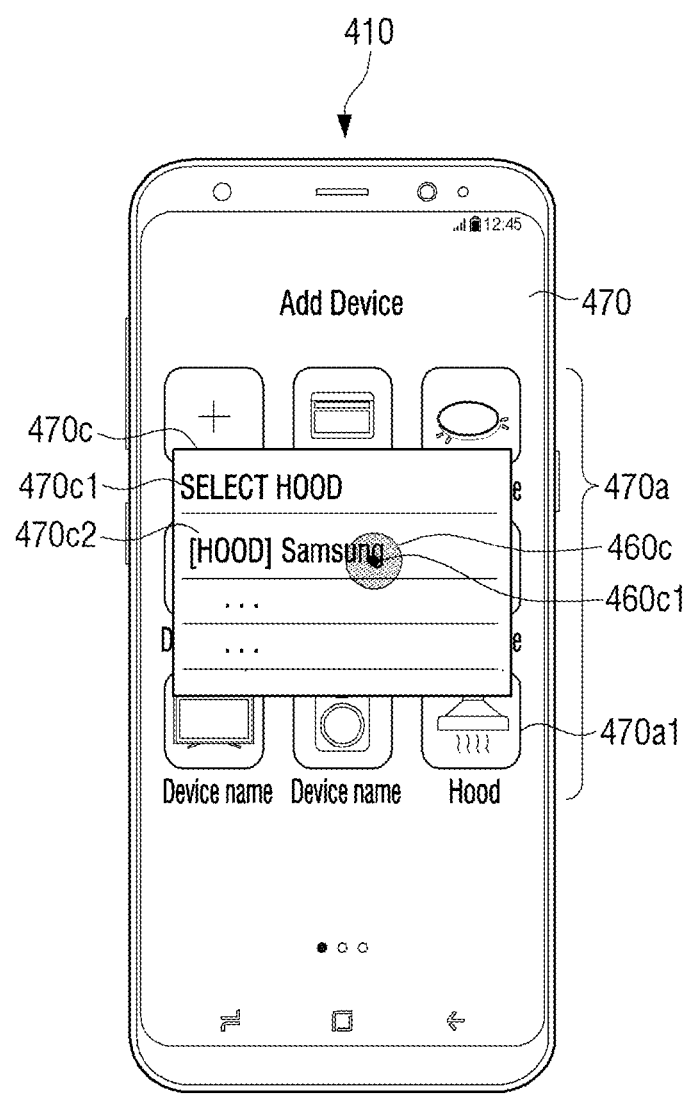

Referring to FIG. 6D, a controller of the portable device 410 may detect a user input 460*b* by using a touch screen 419 and a touch screen controller (not illustrated). A controller of the portable device 410 may calculate a position 460*b*1 (e.g., X2 coordinate and Y2 coordinate) of a user input corresponding to a user input 460*b* by using an electric signal received from a touch screen controller (not illustrated).

A controller of the portable device 410 may display a pop-up 470*c* corresponding to a selection 460*b* of a shortcut icon 470*a*1 in response to receiving the user input 460*b*. The name of the pop-up 470*c* may be 'Select Add 470*c*1'. A text 470*c*2 corresponding to an electronic device (e.g., a range hood) that may be selected (or added) by a user may be displayed in the pop-up 470*c*.

A user input 470*c*2 (e.g., touch or hovering) may be received in the name 470*c*2 of home appliance to be selected.

Figure 6E:
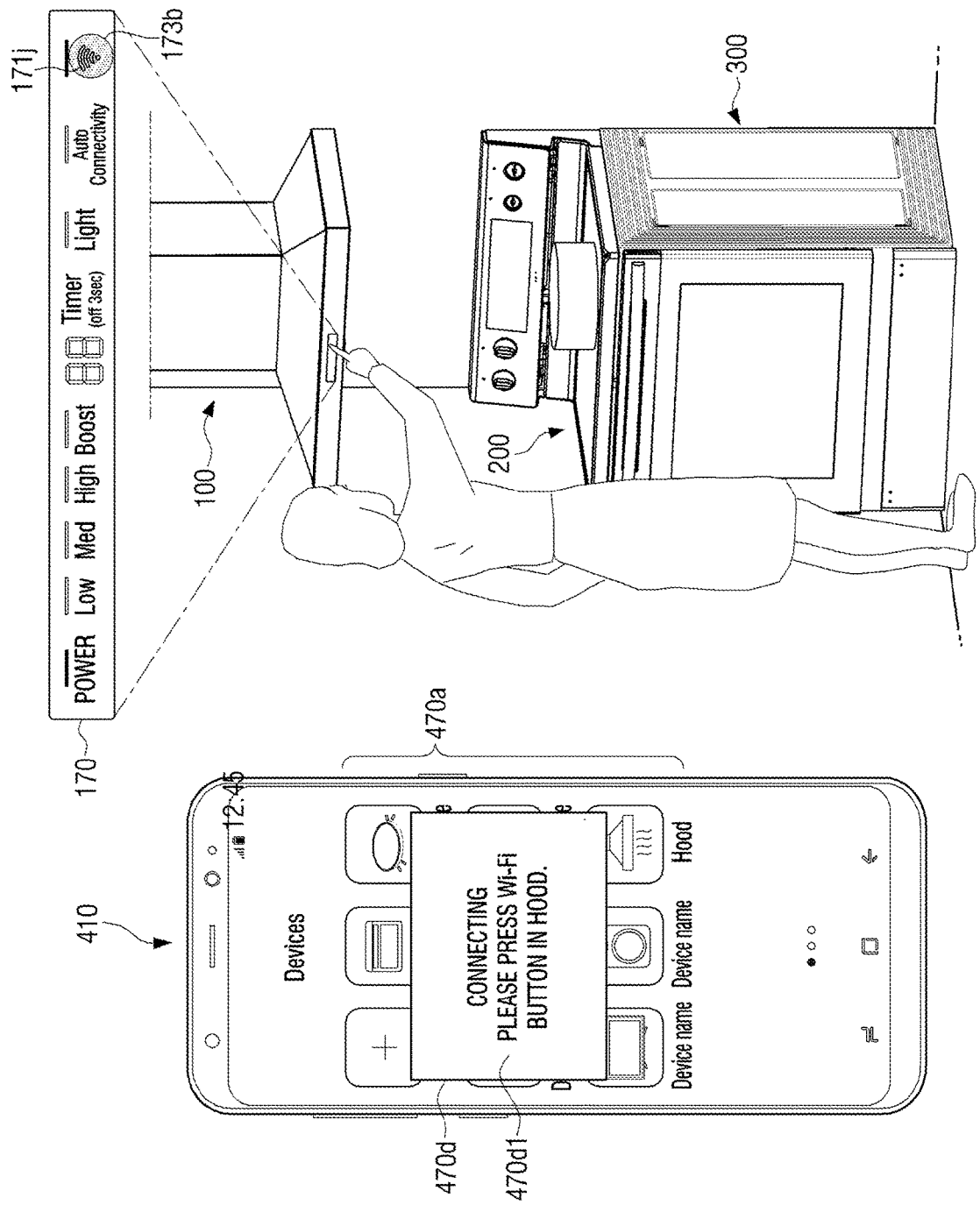

Referring to FIG. 6E, a controller of the portable device 410 may detect a user input 460*c* by using a touch screen 419 and a touch screen controller (not illustrated). A controller of the portable device 410 may calculate a position 460*c*1 (e.g., X2 coordinate and Y2 coordinate) of a user input corresponding to a user input 460*c* by using an electric signal received from a touch screen controller (not illustrated).

A controller of the portable device 410 may display a pop-up 470*d* corresponding to a selection 460*b* of a shortcut icon 470*a*1 in response to receiving the user input 460*c*.

The pop-up 470*d* may be 'Connecting. Please press a Wi-Fi button in the range hood.' 470*d*1. In addition, a position of a Wi-Fi button 171*j* (or wireless connection button) of the range hood 100 may be displayed in the pop-up 470*d*.

The user may select 173*b* (or touch) a wireless connection button 171*j* of a touch screen 170. A controller 110 of a range hood 100 may detect a user selection 173*b* (touch) by using a touch screen 170 and a touch screen controller (not illustrated). The controller 110 may retrieve an external device 400 which is connectable by using a communicator 120 in response to a user selection 173*b*.

A user input 173*b* (e.g., touch) may be received in a Wi-Fi button 171*j* on the touch screen 170 of the range hood 100.

The portable device 410 (or application ('smart home')) may authenticate a range hood 100 through a user input 173*b* in the range hood 100.

When authentication of the range hood 100 is completed, a Wi-Fi password (not illustrated) connecting the range hood 100 and a wireless router (not illustrated) may be input to an application screen (not illustrated) by a user.

By the input Wi-Fi password, the range hood 100 and the wireless router (not illustrated) may be connected to each other. In addition, authentication for connecting the range hood 100 and the server 440 may be additionally performed. Through connection between the server 440 and the range hood 100, the server 440 may provide upgrade of the range hood 100 and/or additional service (e.g., maintenance). In addition, through the connection between the server and the range hood 100, the server 440 may receive at least one of a video and image photographed from the range hood 100 via a communicator (not illustrated) and store it in a storage (not illustrated).

When the range hood 100 is connected to a wireless router, an application ('smart home') installed in the portable device 410 may remotely control the range hood 100.

The operation S430 of FIG. 4 described above may be carried out between the operation S410 of FIG. 4 and the operation S420 of FIG. 4.

Referring back to FIG. 4, in operation S440, a photographed image (or video) may be transmitted to an external device that is connected.

When the communicator 120 of the range hood 100 and the wireless router (not illustrated) are connected, the controller 110 may transmit a photographed (stored) video (or image) to the wireless router (not illustrated) via the communicator 120. The wireless router (not illustrated) may transmit the received video (or image) to a communicator (not illustrated) of the portable device 410. A controller (not illustrated) of the portable device 410 may receive a video (or image) which is transmitted from the wireless router (not illustrated).

After the portable device 410 and the range hood 100 are connected for the first time, the portable device 410 may receive a video 475d (or image) photographed by the camera 150 of the range hood 100 and display it on a screen.

The portable device 410 and the range hood 100 may be connected using a P2P method. When the portable device 410 and the range hood 100 are connected using the P2P method, the controller 110 may directly transmit a photographed (stored) video (or image) to the portable device 410 via the communicator 120.

Figure 6F:
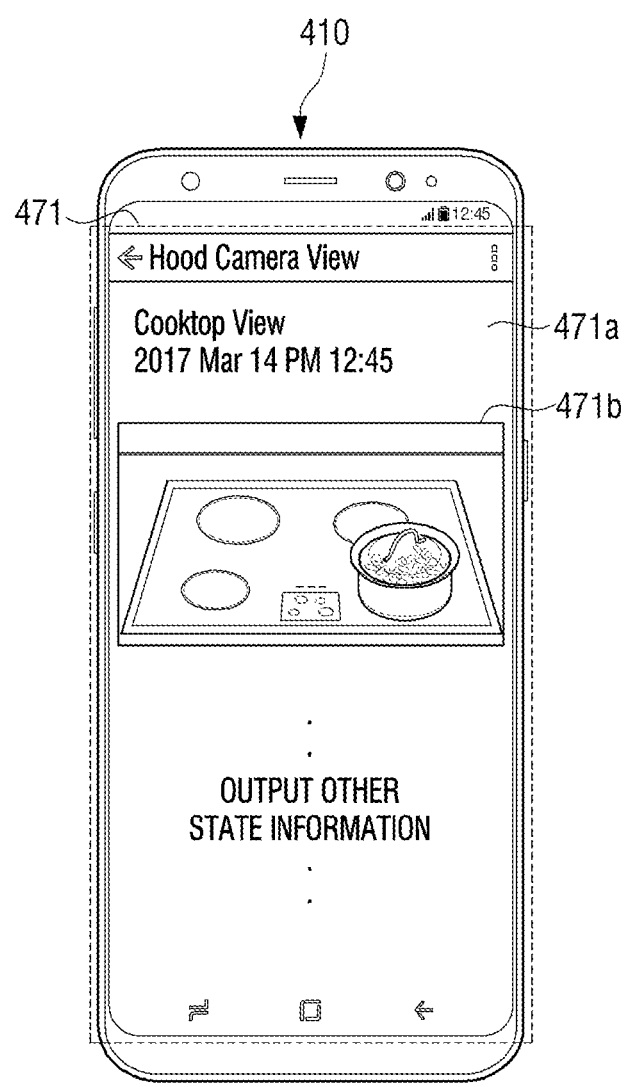

Referring to FIG. 6F, a name 471a of a product to be photographed and a video 471b (or image) photographed by the camera 150 of the range hood 100 may be displayed on an application screen 471.

In operation S440 of FIG. 4, when a video (or image) photographed by a connected external device is transmitted, a method for controlling a range hood is ended.

FIGS. 7A, 7B, 7C, 7D, and 7E are diagrams illustrating an example of a method for controlling a range hood having a camera and an external device according to another example embodiment.

In operation S430 of FIG. 4, an external device is connected.

Figure 7A:
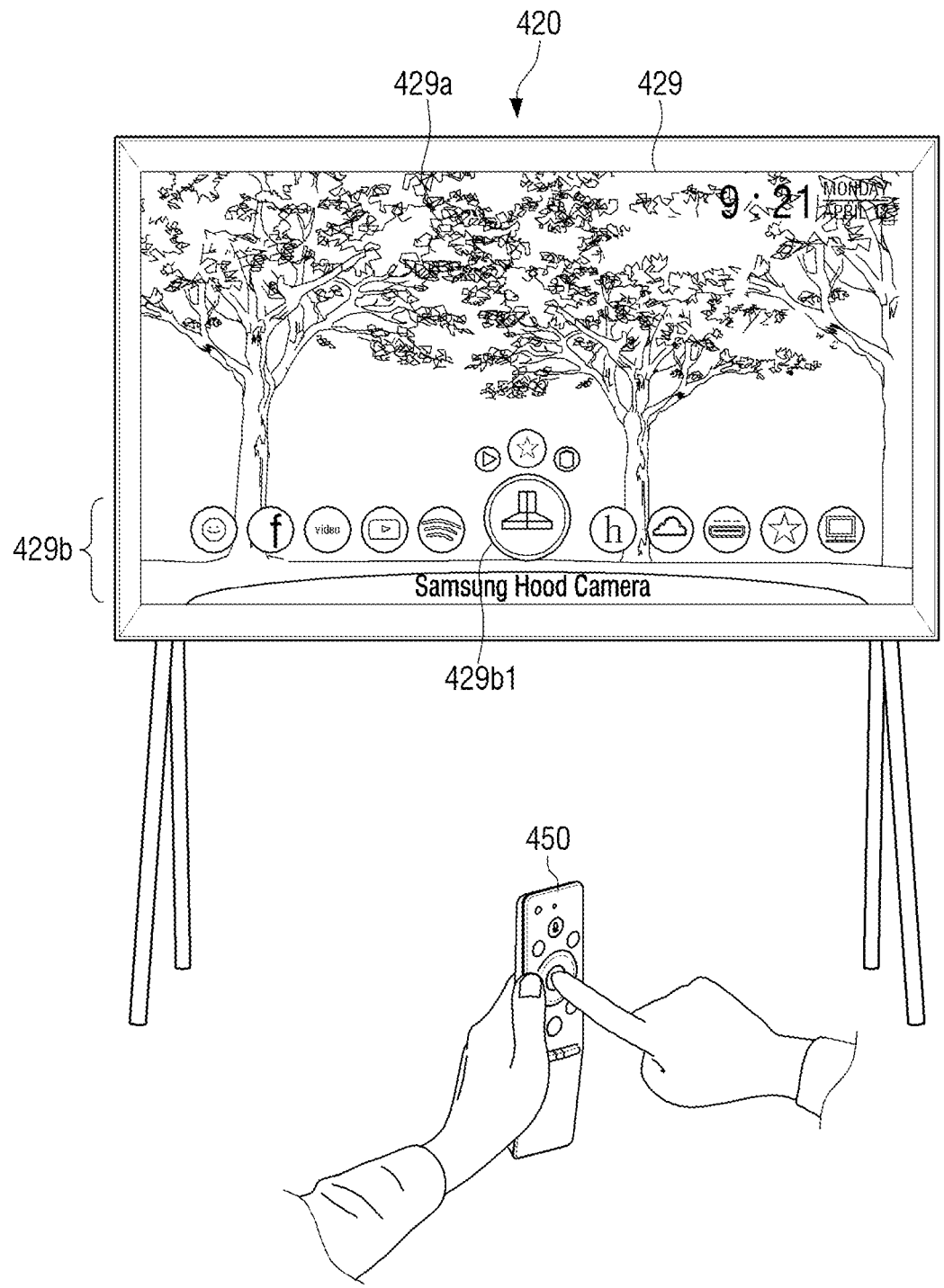
FIGS. 7A, 7B, 7C, 7D, and 7E are diagrams illustrating an example of a method for controlling a range hood having a camera and an external device, according to another embodiment of the present disclosure.

Referring to FIG. 7A, shortcut icons 429b corresponding to applications that are selectable by a user input (e.g., using a remote control device 450) may be displayed at a bottom end of a screen 429 (e.g., liquid crystal display (LCD), LED, quantum dot (QDOT), QDOT LED (QLED), etc.) of a display device 420. The shortcut icons 429b may be overlapped with a content screen 429a and displayed.

The wireless connection between a display device 420 and a range hood 100 of FIG. 7 may be substantially similar (e.g., difference in external device) to the wireless connection between a portable device 410 and a range hood 100 of FIG. 6. In addition, a wireless connection between another external device (e.g., home appliance 430 or server 440) and a range hood 100 may be substantially similar to the above. For example, when a communicator 120 of a range hood 100 is connected to a communicator (not illustrated) of a home appliance 430, at least one of a video and image photographed by a camera of the range hood 100 may be received via the communicator (not illustrated) of the home appliance 430. A controller (not illustrated) of the home appliance 430 may be control a display (not illustrated) of the home appliance 430 to display at least one of a video and image that are received. In addition, when the communicator 120 of the range hood 100 is connected to a communicator (not illustrated) of a server 440, at least one of a video and image photographed by a camera of the range hood 100 may be received via the communicator (not illustrated) of the server 440. A controller (not illustrated) of the server 440 may control such that at least one of the received video and image is stored in a storage (not illustrated).

A user input (e.g., remote control device 450, user voice, user motion, etc.) may be received in a shortcut icon 429b1 corresponding to an application (e.g., 'range hood') capable of controlling the range hood 100 from among the shortcut icons 429b of applications that are selectable. In addition, a user input (e.g., remote control device 450, user voice, user motion, etc.) may be received in a shortcut icon (not illustrated) corresponding to an application (e.g., 'smart home') capable of controlling the range hood 100 and/or the cook top 200 from among the shortcut icons 429b of applications that are selectable.

An application (e.g., 'range hood') capable of controlling the range hood 100 may be pre-installed (or installed) or downloaded by a user and installed. In addition, an application ('smart phone') which is capable of controlling the range hood 100 and/or the cook top 200 may be pre-installed (or installed) in the display device 420 or may be downloaded by a user. The above-described application ('range hood') may be a sub application included in an application ('smart home') or may be a separate application.

A user may select a shortcut icon 429b1 corresponding to an application (e.g., 'range hood') capable of controlling the range hood 100 by using the remote control device 450.

Figure 7B:
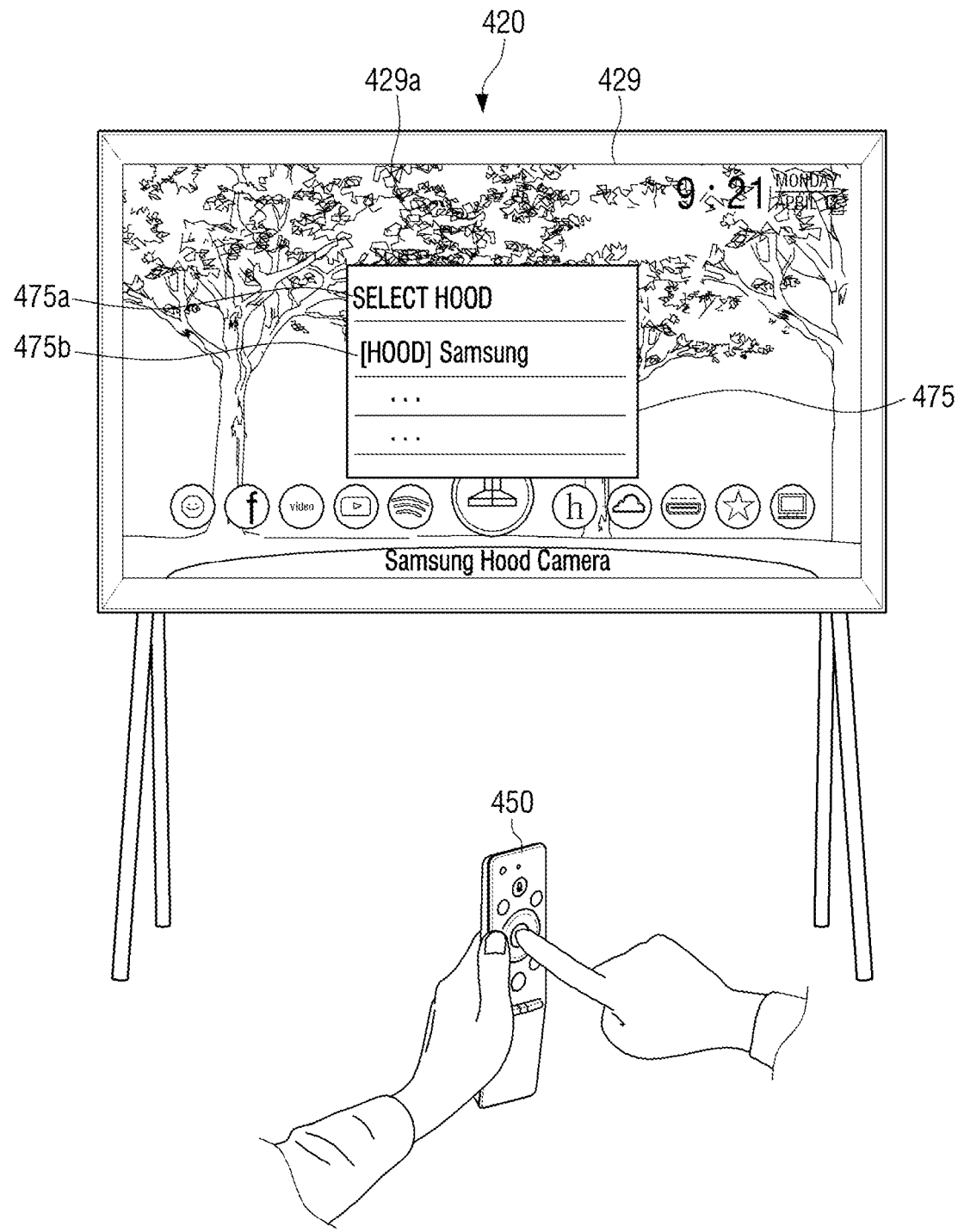

Referring to FIG. 7B, a controller (not illustrated) of the display device 420 may receive (or detect) a selection of a shortcut icon 429b1 by the remote control device 450 by using a communicator (not illustrated) and/or optical receiver (not illustrated).

The controller (not illustrated) of the display device 420 may display a pop-up 475 in response to a selection of the shortcut icon 429b1 by the remote control device 450.

A name of the pop-up 470c may be 'Select range hood' 475a. A text 475b corresponding to an electronic device (e.g., a range hood) that may be selected (or added) by a user may be displayed in the pop-up 475.

A user input (e.g., one of a remote control device, user voice and user motion) may be received in a text 475b corresponding to an electronic device to be selected.

Figure 7C:
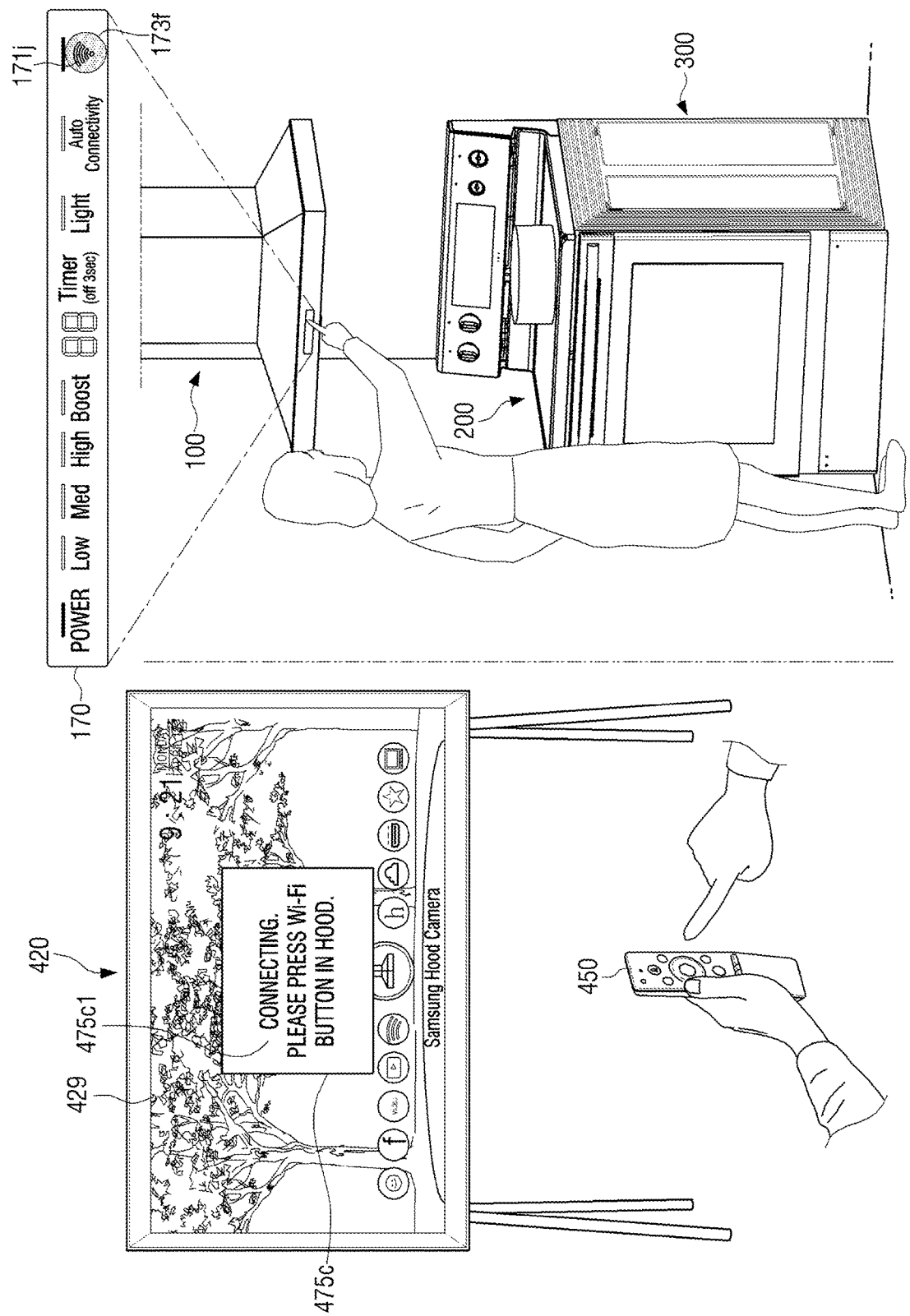

Referring to FIG. 7C, a controller of the display device 420 may receive (or detect) a selection of a text 475b by the remote control device 450 by using a communicator (not illustrated) and/or optical receiver (not illustrated).

The controller of the display device 420 may display a pop-up 475c in response to receiving a selection of the text 475b. The pop-up 475c may be 'Connecting. Please press a Wi-Fi button in the range hood' 470c1. In addition, a position of a Wi-Fi button 171j of the range hood 100 may be displayed in the pop-up 475c.

A user input 173f (e.g., touch) may be received in a Wi-Fi button 171j on the touch screen 170 of the range hood 100.

The portable device 410 (or application ('range hood' or 'smart home') may authenticate a range hood 100 through a user input 173f in the range hood 100.

When authentication of the range hood 100 is completed, a Wi-Fi password (not illustrated) connecting the range hood 100 and a wireless router (not illustrated) may be input to an application screen (not illustrated) by a user.

By the input Wi-Fi password, the range hood 100 and the wireless router (not illustrated) may be connected to each other. In addition, authentication for connecting the range hood 100 and the server 440 may be additionally performed. Through connection between the server 440 and the range hood 100, the server 440 may provide upgrade of the range hood 100 and/or additional service (e.g., maintenance).

When the range hood 100 is connected to a wireless router, an application ('range hood' or 'smart home') installed in the display device 420 may remotely control the range hood 100.

In operation S440 of FIG. 4, a photographed video (or image) may be transmitted to an external device that is connected.

When the communicator 120 of the range hood 100 and the wireless router (not illustrated) are connected, the controller 110 may transmit a photographed (stored) video (or image) to the wireless router (not illustrated) via the communicator 120. The wireless router (not illustrated) may transmit the received video (or image) to a communicator (not illustrated) of the display device 420. A controller (not illustrated) of the display device 420 may receive a video (or image) which is transmitted from the wireless router (not illustrated).

The display device 420 and the range hood 100 may be connected using a P2P method. When the display device 420 and the range hood 100 are connected using the P2P method, the controller 110 may directly transmit a photographed (stored) video (or image) to the display device 420 via the communicator 120.

Figure 7D:
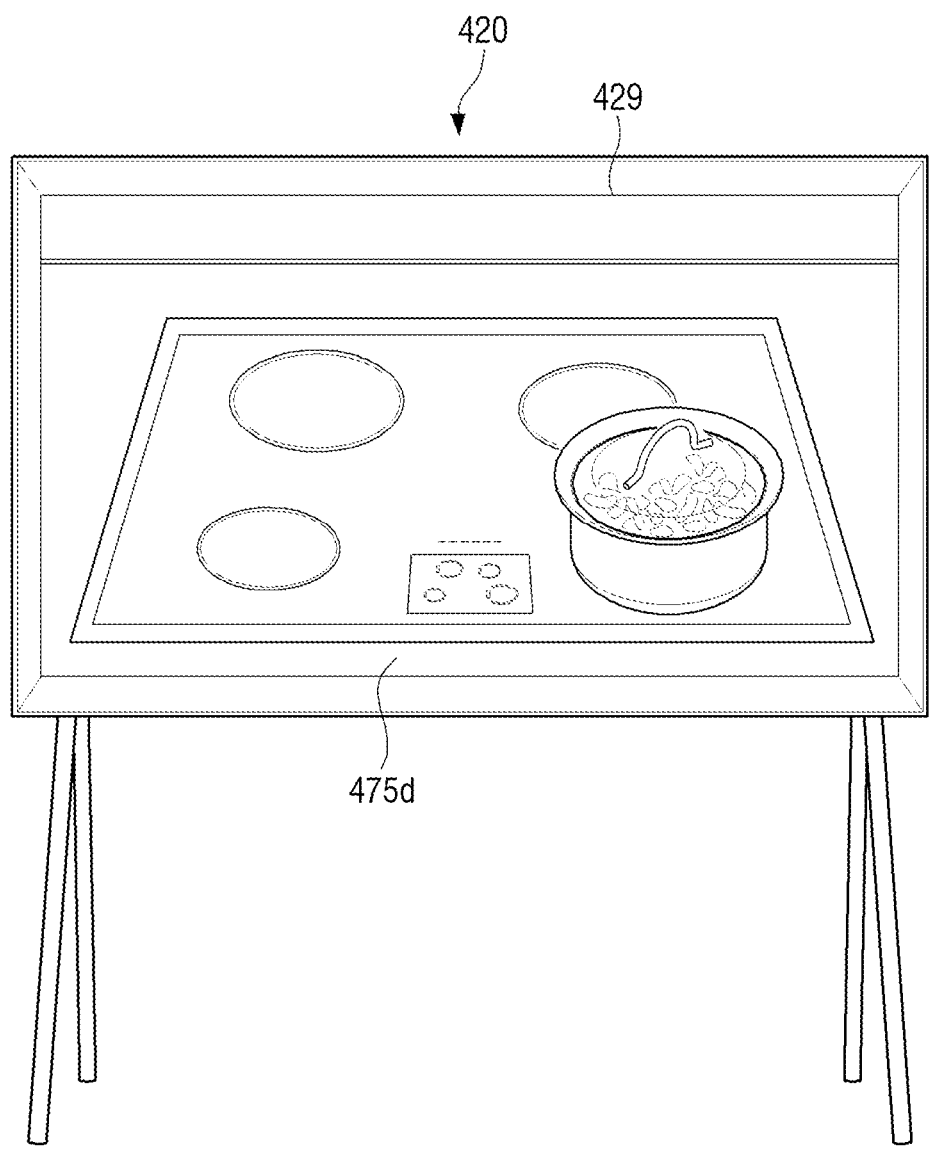

Referring to FIG. 7D, a video 475*d* (or image) which is photographed by a camera 150 of the range hood 100 may be displayed on a screen 429 of the display device 420. After the display device 420 and the range hood 100 are connected for the first time, the display device 420 may receive a video 475*d* (or image) photographed by the camera 150 of the range hood 100 and display it on a screen.

Figure 7E:
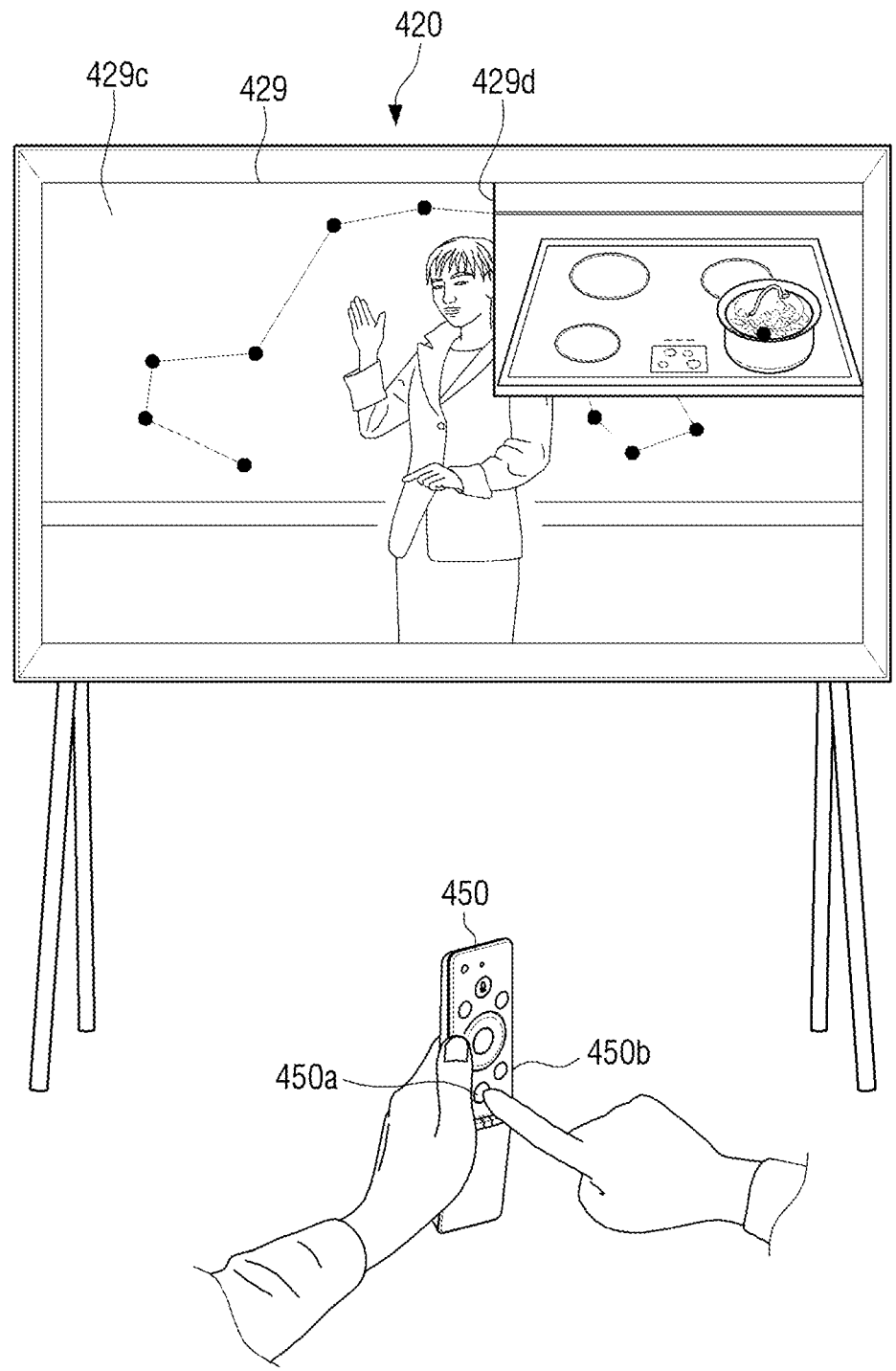

Referring to FIG. 7E, when the display device 420 and the range hood 100 are wirelessly connected to each other (e.g., after operation S430 of FIG. 4 is carried out), the display device 420 may display a video (or image) which is photographed from the range hood 100 on a screen of the display device 420 through a button (or a combination of a plurality of buttons) in a remote control device 450.

When a user selects one button (e.g., 450*a*) or a plurality of buttons (e.g., 450*a* and 450*b* in combination) in the remote control device 450, a controller of the display device 420 may receive (or detect) a selection of the button using the remote control device 450 by using a communicator (not illustrated) and/or an optical receiver (not illustrated).

The controller (not illustrated) of the display device 420 may request the range hood 100 to transmit a photographed video (or image) in response to the selection of the button using the remote control device 450 by using the communicator (not illustrated).

The controller 110 of the range hood 100 may transmit a video (or image) which is photographed by the camera 150 to the portable device 410 via the communicator 120 according to the request of the display device 420.

A controller of the display device 420 may display the video (or image) which is received from the range hood 100 on an additional screen 429*d* of the display device 420. The additional screen 429*d* may be displayed using a picture-in-picture (PIP) method. The additional screen 429*d* may be displayed as being overlapped with a screen 429*c* (or content screen) of the display device 420. The additional screen 429*d* may be disposed on one side (e.g., a corner area or a random area) of the screen 429*c* of the display device 420. An area of the additional screen 429*d* may be smaller than an area of a screen 429*c* (or content screen) of the display device 420.

The controller of the display device 420 may change an area (or size) of the additional screen 429*d* by operating (e.g., drag-and-drop) the remote control device 450. The controller of the display device 420 may change a position of the additional screen 429*d* by operating (e.g., drag-and-drop) the remote control device 450. The controller of the display device 420 may enlarge a video (or image) which is displayed on the additional screen 429*d* to the screen 429*c* of the display device 420 by operating (e.g., double click or double touch) the remote control device 450. In addition, the controller of the display device 420 may reduce the video (or image) which is displayed on the screen 429*c* of the display device 420 again to the additional screen 429*d* by operating (e.g., additional double click or additional double touch) the remote control device 450.

Figure 8A:
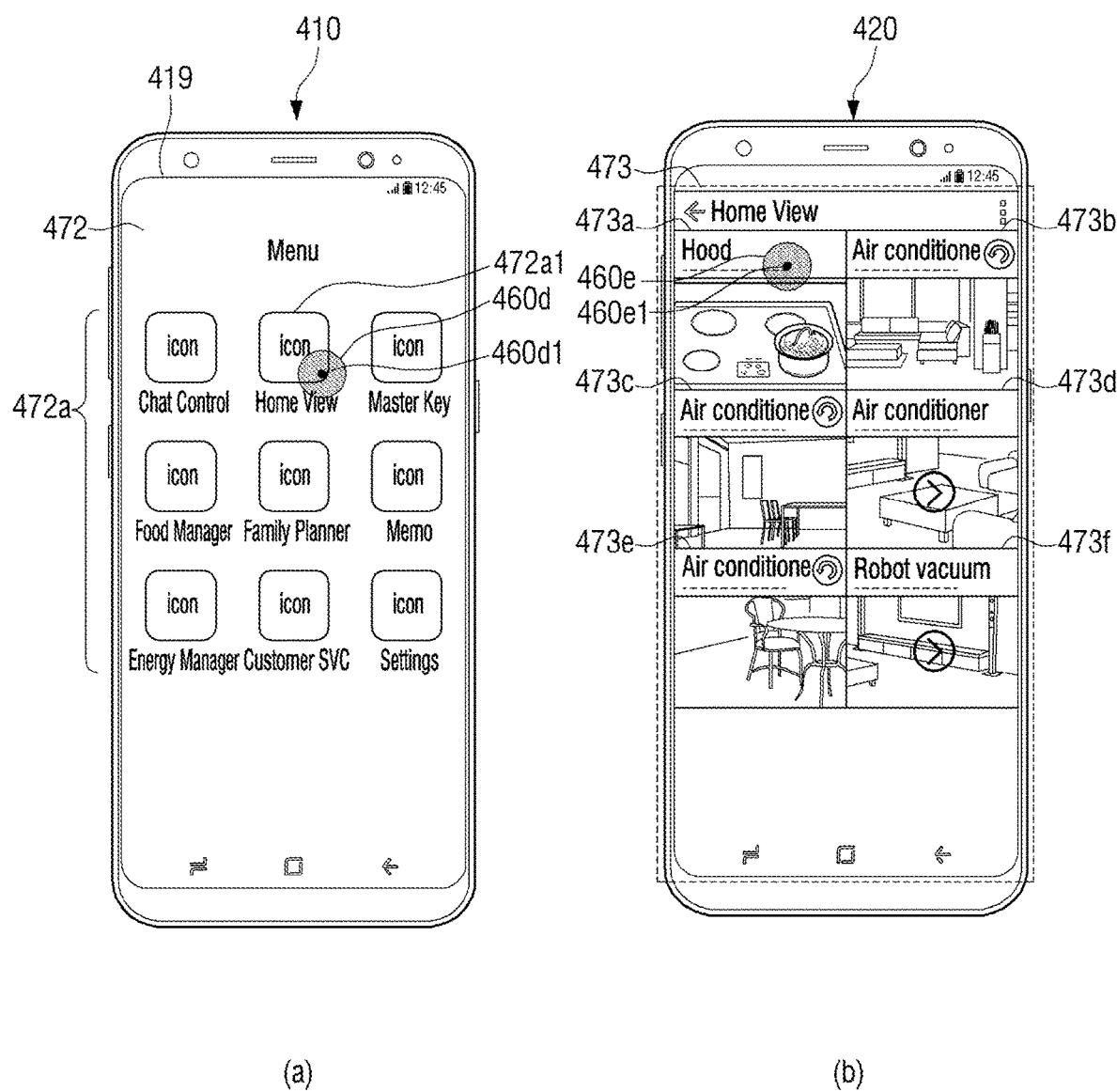
FIGS. 8A and 8B are diagrams illustrating a method for controlling a range hood having a camera according to an embodiment of the present disclosure.
Figure 8B:
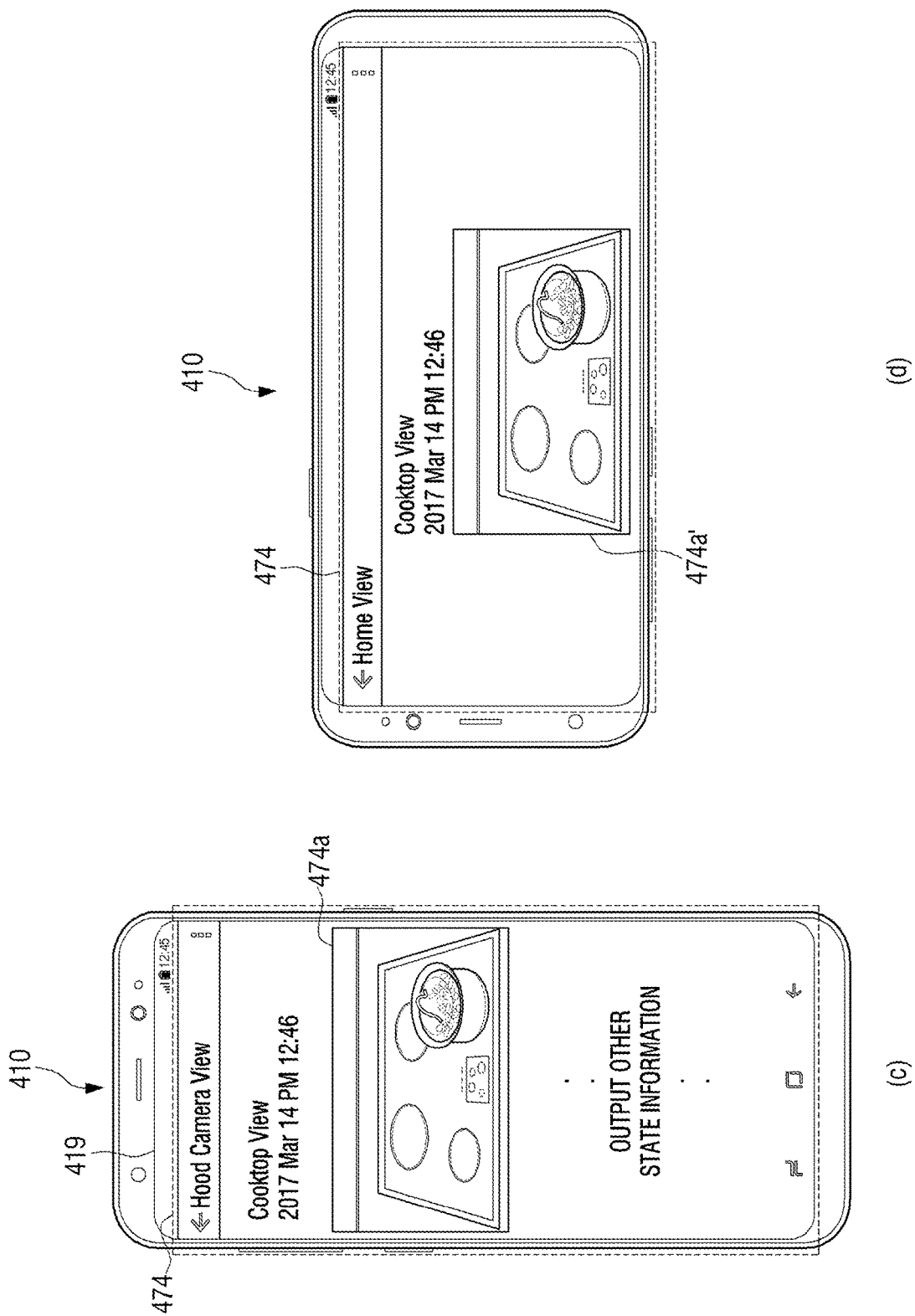

FIGS. 8A and 8B are diagrams illustrating a method for controlling a range hood having a camera according to an embodiment of the present disclosure.

Referring to FIGS. 8A and 8B, a user may remotely check a video (or image) which is photographed in the range hood 100 by using an application installed in the portable device 410. The controller 110 of the range hood 100 may transmit a video (or image) which is photographed by the camera 150 to the portable device 410 via an external device or directly in accordance with a request of a portable terminal (or application). In additional, various home appliances 430 which are positioned at home (e.g., refrigerator, air conditioner, washing machine, robot cleaner, air purifier, dehumidifier, humidifier, etc.) as well as the range hood 100 may transmit a video (or image) photographed by a camera (not illustrated) positioned in the home appliance to the portable device 410 via an external device or directly in accordance with a request of the portable terminal (or application).

Referring to (a) of FIG. 8A, a user input 460*d* may be received in a shortcut icon 427*a*1 from among a plurality of shortcut icons 472*a* that are selectable from an application screen 472 of the portable device 410.

The controller (not illustrated) of the portable device 410 may detect the user input 460*d* by using a touch screen 419 and a touch screen controller (not illustrated). The controller (not illustrated) of the portable device 410 may calculate a position 460*d*1 (e.g., X1 coordinate and Y1 coordinate) of a user input corresponding to a user input 460*d* by using an electric signal received from a touch screen controller (not illustrated).

Referring to (b) of FIG. 8A, the controller (not illustrated) of the portable device 410 may display an application screen 473 (e.g., 'home view') corresponding to the shortcut icon 472*a*1 in response to receiving the user input 460*d*.

Videos (or images) which are photographed by a camera (not illustrated) may be respectively displayed 473*a* to 473*f* on the application screen 473. The videos (or images) may be respectively displayed as being smaller than an area of the touch screen 419 to correspond to the number of external devices 400 wirelessly connected to the portable device 410. For example, when the number of external devices 400 wirelessly connected to the portable device 410 is one, the number of videos (or images) displayed on the application screen 473 may be one. When the number of external devices 400 wirelessly connected to the portable device 410 is six, the number of videos (or images) displayed on the application screen 473 may be six.

A size (or area) of the videos (or images) displayed on the application screen 473 may differ according to the number of external devices 400 wirelessly connected to the portable device 410. For example, an area of videos (or images) in which the number of external devices wirelessly connected to the portable device 410 is one may be larger than an area of videos (or images) in which the number of external devices 400 wirelessly connected to the portable device 410 is six.

A user input 460*e* may be received in a video (or image) corresponding to the range hood 100 in the application screen 473.

A controller of the portable device 410 may detect a user input 460*e* by using a touch screen 419 and a touch screen controller (not illustrated). The controller (not illustrated) of the portable device 410 may calculate a position 460*e*1 (e.g., X5 coordinate and Y5 coordinate) of a user input corresponding to a user input 460*e* by using an electric signal received from a touch screen controller (not illustrated).

The controller of the portable device 410 may display an application screen 474 (e.g., 'range hood view') corresponding to a video (or image) photographed from the range hood 100 in response to receiving the user input 460*e*.

Referring to (c) and (d) of FIG. 8B, the controller of the portable device 410 may display a video (or image, one of 474*a* and 474*a*') which is photographed from the range hood 100 on the application screen 474 in response to receiving the user input 460*e*. The controller of the portable device 410 may display a video (or image, one of 474*a* and 474*a*') which is photographed from the range hood 100 on the application screen 474 corresponding to reception of the user input 460*e* and an orientation of the portable device 410.

Figure 5:
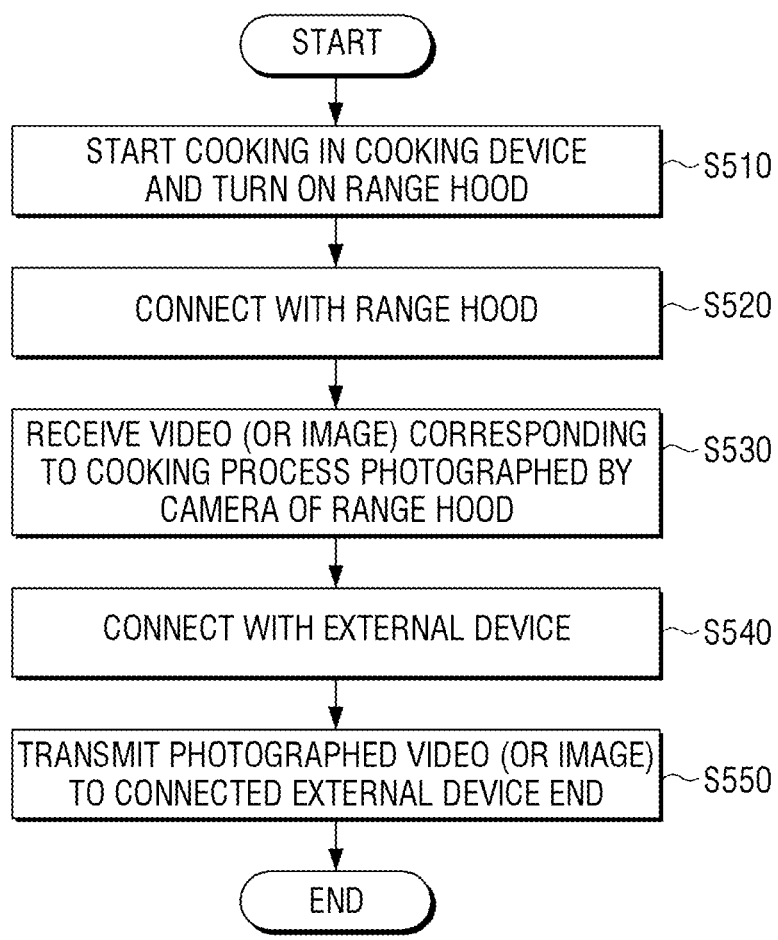
FIG. 5 is a flowchart illustrating a method for controlling a range hood having a camera and a cook top according to an another embodiment of the present disclosure.

FIG. 5 is a flowchart illustrating a method for controlling a range hood having a camera and a cook top according to another embodiment of the present disclosure.

Referring to FIG. 5, a schematic flowchart illustrates a method for controlling a range hood having a camera and a cook top may be substantially similar (e.g., a cook top is added) to the schematic diagram illustrating a method for controlling a range hood having a camera of FIG. 4.

In operation S510 of FIG. 5, cooking starts in the cooking device and the power of a range hood is turned on. The operation S510 of FIG. 5 is substantially similar to the operation S410 of FIG. 4 and, thus, the redundant description is omitted herein.

In operation S520 of FIG. 6, a range hood is connected.

A cook top 200 (or cooking device) and the range hood 100 may be wirelessly connected to each other. When it is difficult to transmit a video (or image) photographed in the range hood 100 to an external device 400 (or when transmission of wireless data to an external device is in bad quality), the video (or image) photographed in the range hood 100 may be transmitted (via wired communication or wireless communication) to the cook top via the communicator 120. When it is difficult to transmit a video (or image) photographed in the range hood 100 to an external device 400 (or when transmission of wireless data to an external device is in bad quality), the video (or image) photographed in the range hood 100 may be transmitted to the cook top via the communicator 120 using a Bluetooth method or a Bluetooth low energy.

The cook top 200 may be always connected to the range hood 100 via wireless communication (e.g., Bluetooth low energy or Bluetooth), or may be automatically connected 171*i* (by selecting an auto connectivity button, see FIG. 1B) to the touch screen 170.

A storage 290 of the cook top 200 and/or a storage 190 of the range hood 100 may respectively store wireless connection information (e.g., a service set identifier (SSID), an internet protocol (IP) address, a connection password, etc.).

In operation S530 of FIG. 5, a video (or image) corresponding to a cooking process photographed by a camera of the range hood is received.

When the cook top 200 and the range hood 100 is connected wirelessly (or via cable), a controller 110 of the range hood 100 may transmit a video (or image) corresponding to a cooking process photographed through a camera 150 to a communicator 220 of the cook top via a communicator 120. When no additional user input is received, a controller 110 of the range hood 100 may continuously transmit a video (or image) corresponding to a cooking process photographed through a camera 150 to a communicator 220 of the cook top via a communicator 120.

A controller 210 of the cook top 200 may store the received video (or image) in a storage 290.

In operation S540 of FIG. 5, an external device is connected.

In operation S540 of FIG. 5, the cook top 200 and an external device 400 may be connected to each other, and in operation S430 of FIG. 4, the range hood 100 and the external device 400 may be connected to each other.

The connection between the cook top 200 and the external device 400 is substantially similar to the connection between the range hood 100 and the external device 400 and thus, redundant description will be omitted herein. For example, in (a) of FIG. 6C corresponding to the operation S430 of FIG. 4, a shortcut icon 470*a*1 corresponding to the range hood 100 in a home screen 419*a* displayed on a touch screen 419 (or referred to as 'display') of a portable device 410 may be selected by a user, and in the operation S540 of FIG. 5, a shortcut icon (not illustrated) corresponding to the cook top 200 in the home screen 419*a* displayed on the touch screen 419 of the portable device 410 may be selected by a user.

A process after a short icon (not illustrated) corresponding to the cook top 200 is selected by a user in the operation S540 of FIG. 5 is substantially similar to a process after a shortcut icon 470*a*1 corresponding to the range hood 100 in the operation S430 of FIG. 4 is selected by a user and thus, redundant description will be omitted herein.

In operation S550 of FIG. 5, a photographed image (or video) may be transmitted to an external device that is connected.

A controller (not illustrated) of the cook top 200 may transmit the video (or image) received from the range hood 100 to external devices 410 to 440 via a communicator (not illustrated).

The transmission of a video (or image) received from the cook top 200 to the external device 400 in the operation S550 of FIG. 5 is substantially similar to the transmission of a video (or image) received from the range hood 100 to the external device 400 and thus, redundant description will be omitted herein.

In operation S550 of FIG. 5, when a video (or image) is transmitted to a connected external device, a method for controlling a range hood and a cook top is ended.

Figure 9A:
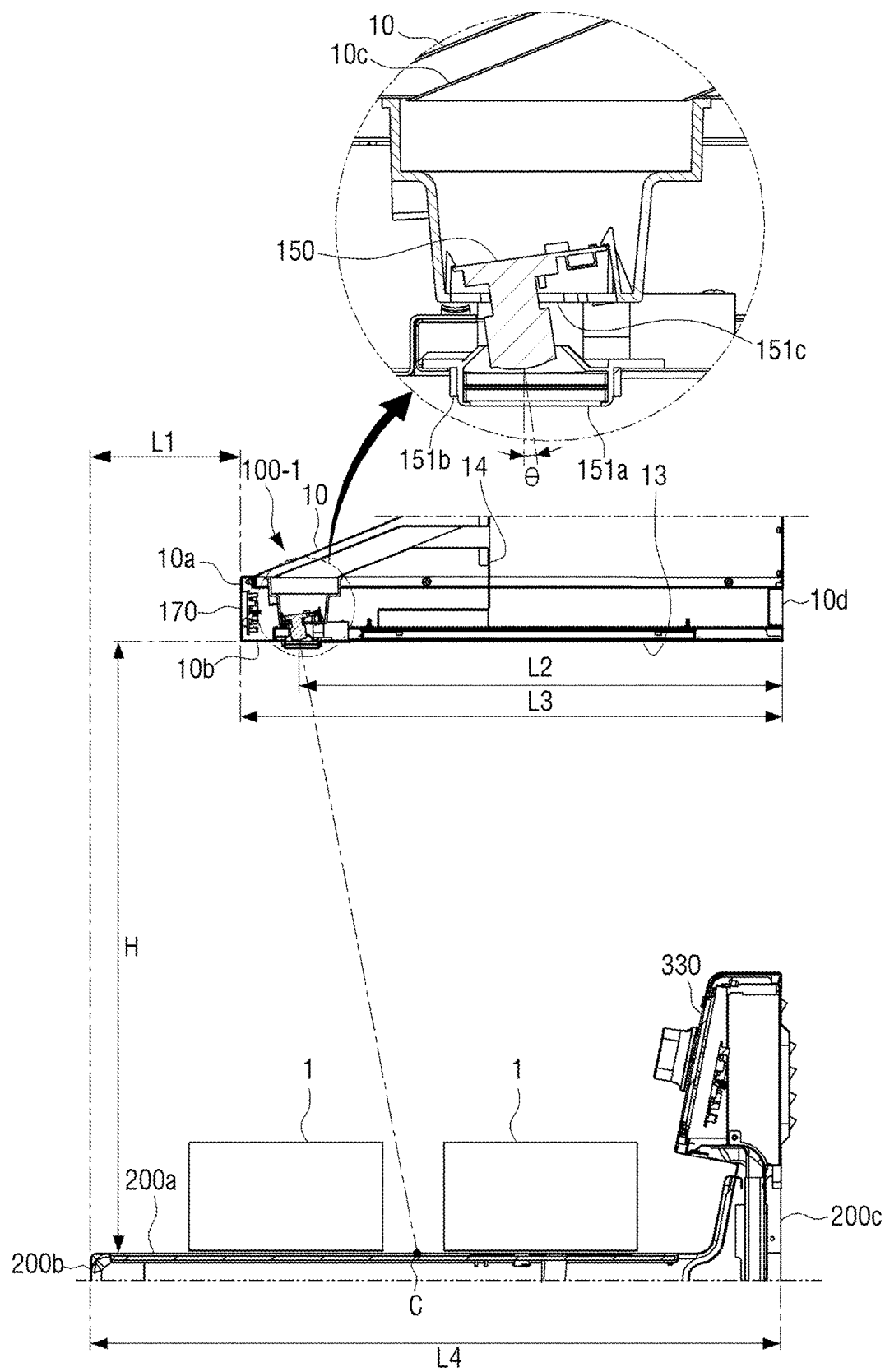
FIGS. 9A and 9B are sectional views illustrating a range hood having a camera according to another embodiment of the present disclosure.
Figure 9B:
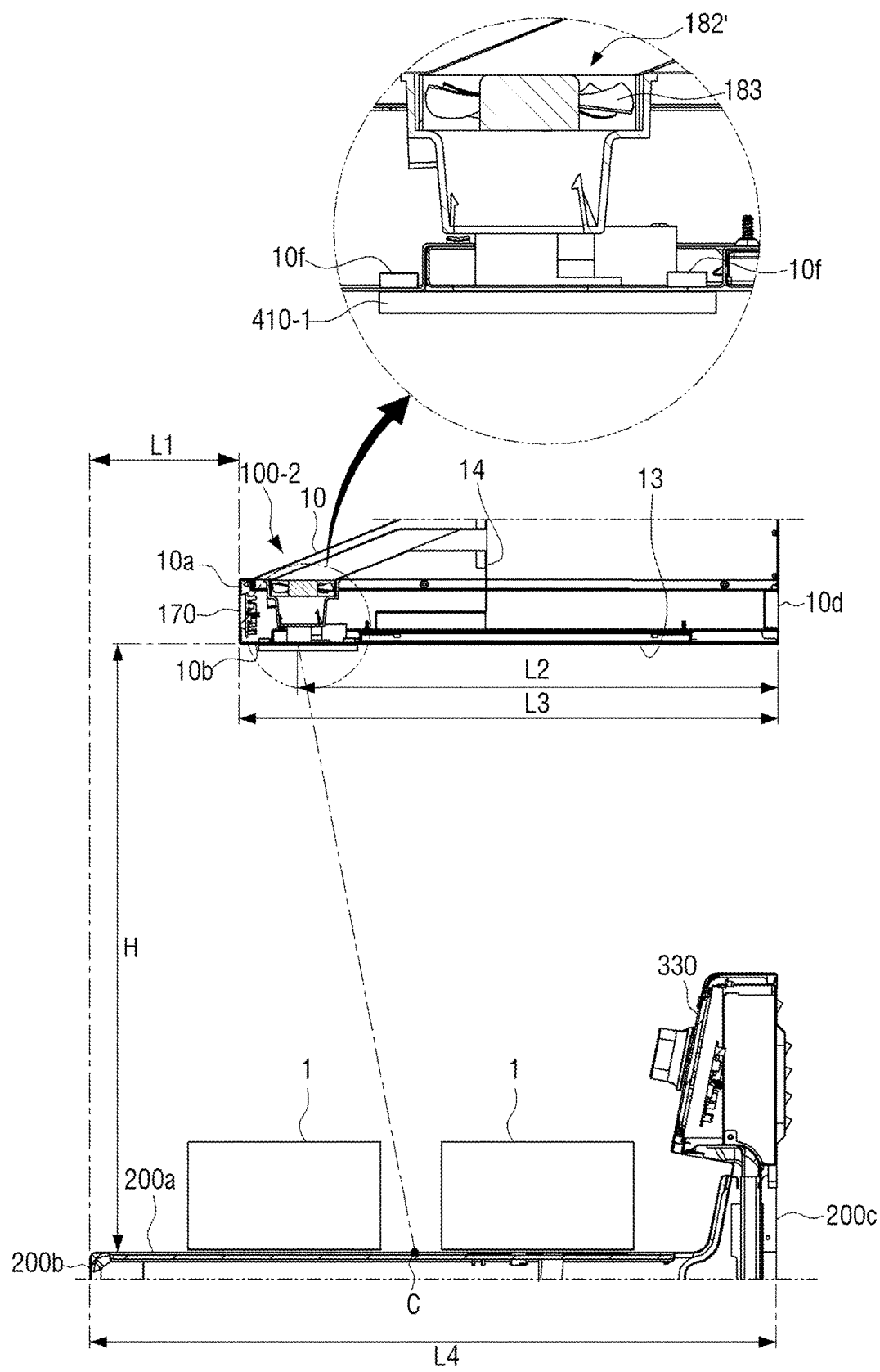

FIGS. 9A and 9B are sectional views illustrating a range hood having a camera, according to another embodiment of the present disclosure.

Referring to FIG. 9A, a range hood 100-1 according to another example embodiment is illustrated. In FIG. 9A, a second driver 182' is removed from the range hood 100-1 unlike the range hood 100 of FIG. 3. The range hood 100-1 from which the second driver 182' is removed is substantially similar to the range hood 100 of FIG. 3 and thus, redundant description will be omitted herein.

The range hood 100-1 from which the second driver 182' is removed of FIG. 9A may absorb a smoke, cooking paper and/or odor which are generated in the cooking process through a cooking container 1 placed on the upper plate 200*a* of the cook top 200 by using a first driver 180'.

Referring to FIG. 9B, a range hood 100-2 according to another example embodiment is illustrated. In FIG. 9B, a camera 150 is removed from the range hood 100-2 unlike the range hood 100 of FIG. 3. The range hood 100-2 from which the camera 150 is removed is substantially similar to the range hood 100 of FIG. 3 and, thus, a redundant description will be omitted herein.

The range hood 100-2 from which the camera 150 is removed of FIG. 9B may photograph a video (or image) of a cooking process of a cooking container 1 placed on an upper plate 200*a* of the cook top 200 by using a camera (not illustrated) of an additional portable device 410-1. The additional portable device 410 may come in contact with a bottom surface 10b of the range hood 100 by one or a plurality of magnets 10f.

A communicator (not illustrated) of the additional portable device 410 may be connected to a communicator (not illustrated) of the range hood 100-2 wirelessly (or via cable). In addition, the communicator (not illustrated) of the additional portable device 410 may be connected to a communicator 220 of the cook top 200 wirelessly (or via cable). The additional portable device 410-1 may transmit the photographed video (or image) to at least one of the range hood 100-2 and the cook top 200.

The methods according to various embodiments of the present disclosure may be implemented as a program instruction type that may be performed through various computer units and may be recorded in a non-transitory computer readable medium. The computer-readable medium may include a program command, a data file, a data structure or the like, alone or a combination thereof. For example, the computer-readable medium may be stored in a volatile or non-volatile storage device such as a ROM, a memory such as a RAM, a memory chip, and a device or an integrated circuit, or a storage medium which may be read with a machine (for example, computer) simultaneously with being optically or magnetically recorded like a compact disc (CD), a digital versatile disc (DVD), a magnetic disk, a magnetic tape, or the like, regardless of whether it is deleted or again recorded.

In additional, the computer-readable medium may be stored in a computer-readable storage medium of a server, and the computer program may be downloaded to a computing device via network.

The memory which may be included in a range hood may be one example of a storage medium which may be read with programs including instructions implementing the various embodiments of the present disclosure or a machine appropriate to store the programs. The program commands recorded in the computer-readable medium may be designed for the various embodiments or be known to those skilled in a field of computer software.

While the present disclosure has been shown and described with reference to various embodiments thereof, it will be understood by those skilled in the art that various changes in form and details may be made therein without departing from the scope and spirit of the present disclosure as defined by the appended claims and their equivalents.

What is claimed is:
1. A range hood comprising:
a main body including a bottom surface and a front surface;
a first driver assembly disposed in the main body and including a first motor and a first fan, the first motor being configured to rotate the first fan to cause air to move through an intake opening in a downward facing portion of the main body;
a first camera disposed in the bottom surface of the main body and configured to capture a first image of an upper plate of a cook top that is positioned below the main body;
a second camera disposed on the front surface of the main body and configured to capture a second image of a user;
a second driver assembly disposed in the main body and including a second motor and a second fan, the second motor being configured to rotate the second fan to cause air to move in an unenclosed free space in front of the first camera beneath the bottom surface of the main body;
a display disposed in the front surface of the main body;
a transceiver disposed in the main body; and
a processor disposed in the main body,
wherein the processor is configured to:
control the first camera to capture the first image of the upper plate of the cook top,
control the display to display a graphical user interface (GUI) for viewing the first image,
control the display to display the first image,
identify whether smoke is generated on the cook top from the first image,
based on the smoke being identified from the first image, control to absorb the smoke through the intake opening in the main body by controlling operation of the first motor that is configured to rotate the first fan to cause air to move through the intake opening in the downward facing portion of the main body,
identify whether there is fogging of the first camera from the first image,
based on the fogging of the first camera being identified from the first image, control to mitigate the fogging of the first camera by controlling operation of the second motor that is configured to rotate the second fan to cause air to move in the unenclosed free space in front of the first camera beneath the bottom surface of the main body,
based on the fogging of the first camera not being identified from the first image while controlling to mitigate the fogging of the first camera, discontinue the controlling to mitigate the fogging of the first camera,
control the second camera to capture the second image of the user, and
control the transceiver to transmit the first image to an external device,
wherein an optical axis of the first camera is inclined counterclockwise by a setting degree with reference to a virtual line extended at right angles from the upper plate of the cook top,
wherein the setting degree is obtained based on a mathematical equation as below,
equation:

$$\theta = \tan^{-1}\left[\frac{L2 - (L4/2)}{H}\right],$$

wherein the $\theta$ is the setting degree,
wherein the H is a distance from the upper plate of the cook top to the bottom surface of the range hood,
wherein the L2 is a distance from a rear surface of the range hood to the first camera of the range hood, and
wherein the L4 is a distance from a rear surface of the cook top to a front surface of the cook top.
2. The range hood of claim 1, wherein the processor is further configured to:
control the display to display a plurality of icons including a Wi-Fi connection button, and
in response to selection of the Wi-Fi connection button, control the transceiver to establish a Wi-Fi connection with the external device and transmit the first image to the external device.

3. The range hood of claim 1, wherein the processor is further configured to control the transceiver to transmit the first image to the external device via a transceiver of the cook top.

4. The range hood of claim 1,
wherein the main body includes an opening in the bottom surface,
wherein the processor is further configured to control the first camera to capture the first image through the opening.

5. The range hood of claim 1, wherein the processor is further configured to control to absorb at least one of the smoke, cooking vapors, or cooking odor through the intake opening in the main body by controlling the operation of the first motor that is configured to rotate the first fan to cause air to move through the intake opening in the downward facing portion of the main body.

6. The range hood of claim 1, wherein the processor is further configured to control an auxiliary light source on the main body to be operated while capturing the first image.

7. The range hood of claim 1,
wherein the processor is further configured to:
control to cool a temperature of the first camera by controlling the operation of the second motor that is configured to rotate the second fan to cause air to move in the unenclosed free space in front of the first camera beneath the bottom surface of the main body.

8. The range hood of claim 1, wherein a distance from a front surface of the range hood to a rear surface of the range hood is smaller than a distance from a front surface of the cook top to a rear surface of the cook top.

9. The range hood of claim 1, wherein the processor is further configured to:
control the display to display a plurality of icons including a button, and
in response to selection of the button, control the operation of the first motor that is configured to rotate the first fan to cause air to move through the intake opening in the downward facing portion of the main body.

10. The range hood of claim 1, wherein the first image includes at least one of a state of the cook top or a state of a cooking container placed on the cook top.

11. The range hood of claim 10, wherein the processor is further configured to recognize at least one from among a location and size of the cook top from the first image.

12. The range hood of claim 10, wherein the processor is further configured to recognize at least one of a position or an area of a flame intake of the cook top from the first image.

13. The range hood of claim 10, wherein the processor is further configured to recognize the cooking container placed on the cook top from the first image.

14. The range hood of claim 10, wherein the processor is further configured to recognize smoke that is generated from the cooking container placed on the cook top from the first image.

15. The range hood of claim 10, wherein the processor is further configured to recognize a foreign substance attached to a glass positioned in front of the first camera from the first image.

16. The range hood of claim 10, wherein the processor is further configured to recognize boiling of water in the cooking container from the first image.

17. The range hood of claim 1, wherein the processor is further configured to control the display to display a GUI corresponding to at least one of data transmission, displaying of an application, a state of the cook top, or a state of a cooking container.

18. A method performed by a range hood that includes a main body including a bottom surface and a front surface, a first driver assembly disposed in the main body and including a first motor configured to rotate a first fan of the first driver assembly to cause air to move through an intake opening in a downward facing portion of the main body, a first camera disposed in the bottom surface of the main body and configured to capture a first image of an upper plate of a cook top that is positioned below the main body, a second camera disposed on the front surface of the main body and configured to capture a second image of an user, a second driver assembly disposed in the main body and including a second motor configured to rotate a second fan of the second driver assembly to cause air to move in an unenclosed free space in front of the first camera beneath the bottom surface of the main body, and a display disposed in the front surface of the main body, the method comprising:
capturing, through the first camera, the first image of the upper plate of the cook top;
displaying a graphical user interface (GUI) for viewing the first image;
displaying, through the display, the first image;
identifying whether smoke is generated on the cook top from the first image;
based on the smoke being identified from the first image, absorbing the smoke through the intake opening in the main body by controlling operation of the first motor that is configured to rotate the first fan to cause air to move through the intake opening in the downward facing portion of the main body;
identifying whether there is fogging of the first camera from the first image;
based on the fogging of the first camera being identified from the first image, mitigating the fogging of the first camera by controlling operation of the second motor that is configured to rotate the second fan to cause air to move in the unenclosed free space in front of the first camera beneath the bottom surface of the main body;
based on the fogging of the first camera not being identified from the first image while mitigating the fogging of the first camera, discontinuing the mitigating of the fogging of the first camera;
capturing the second image of the user through the second camera; and
transmitting the first image to an external device,
wherein an optical axis of the first camera is inclined counterclockwise by a setting degree with reference to a virtual line extended at right angles from the upper plate of the cook top,
wherein the setting degree is obtained based on a mathematical equation as below,
equation:

$$\theta = \tan^{-1}\left[\frac{L2 - (L4/2)}{H}\right],$$

wherein the θ is the setting degree,
wherein the H is a distance from the upper plate of the cook top to the bottom surface of the range hood,
wherein the L2 is a distance from a rear surface of the range hood to the first camera of the range hood, and
wherein the L4 is a distance from a rear surface of the cook top to a front surface of the cook top.

* * * * *